United States Patent
Negishi et al.

(10) Patent No.: US 8,728,963 B2
(45) Date of Patent: *May 20, 2014

(54) OPTICAL GLASS

(71) Applicant: Hoya Corporation, Tokyo (JP)

(72) Inventors: Tomoaki Negishi, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,860

(22) Filed: Mar. 5, 2013

(65) Prior Publication Data

US 2013/0178354 A1   Jul. 11, 2013

Related U.S. Application Data

(62) Division of application No. 13/339,397, filed on Dec. 29, 2011, now Pat. No. 8,410,008, which is a division of application No. 12/491,541, filed on Jun. 25, 2009, now Pat. No. 8,110,514.

(30) Foreign Application Priority Data

Jun. 27, 2008 (JP) .................... 2008-168804
Jun. 9, 2009 (JP) .................... 2009-138020

(51) Int. Cl.
- C03C 3/155 (2006.01)
- C03C 3/15 (2006.01)
- C03C 3/066 (2006.01)
- C03C 3/068 (2006.01)

(52) U.S. Cl.
USPC ............. 501/51; 501/50; 501/78; 501/79

(58) Field of Classification Search
USPC .................. 501/50, 51, 79, 78
See application file for complete search history.

(56) References Cited

U.S. PATENT DOCUMENTS

| | | | |
|---|---|---|---|
| 4,166,746 A | 9/1979 | Ishibashi et al. | |
| 4,268,312 A | 5/1981 | Ishibashi et al. | |
| 4,980,318 A | 12/1990 | Araujo | |
| 6,187,702 B1 | 2/2001 | Morishita | |
| 6,912,093 B2 | 6/2005 | Endo | |
| 7,091,145 B2 | 8/2006 | Wolff et al. | |
| 7,598,193 B2 | 10/2009 | Endo | |
| 7,897,532 B2 | 3/2011 | Onoda et al. | |
| 8,110,514 B2 * | 2/2012 | Negishi et al. | 501/51 |
| 8,127,570 B2 * | 3/2012 | Negishi et al. | 65/61 |
| 8,187,986 B2 * | 5/2012 | Fu | 501/51 |
| 8,410,008 B2 * | 4/2013 | Negishi et al. | 501/51 |
| 8,492,299 B2 * | 7/2013 | Negishi et al. | 501/79 |
| 2004/0023787 A1 | 2/2004 | Wolff et al. | |
| 2005/0049135 A1 | 3/2005 | Hayashi | |
| 2006/0105900 A1 | 5/2006 | Kasuga et al. | |
| 2006/0189473 A1 | 8/2006 | Endo | |
| 2007/0105702 A1 | 5/2007 | Matsumoto et al. | |
| 2011/0257001 A1 * | 10/2011 | Negishi | 501/42 |
| 2011/0257002 A1 * | 10/2011 | Negishi | 501/78 |

FOREIGN PATENT DOCUMENTS

| | | |
|---|---|---|
| JP | 55-60039 | 5/1980 |
| JP | 59013647 A | 1/1984 |
| JP | 2004-18371 | 1/2004 |
| JP | 2006-137645 | 6/2006 |
| JP | 2006182577 A | 7/2006 |
| JP | 2006248897 A | 9/2006 |
| JP | 2007153734 A | 6/2007 |
| JP | 2009120485 A | 6/2009 |
| WO | WO 2008050591 A1 | 5/2008 |
| WO | WO 2008050819 A1 | 5/2008 |

* cited by examiner

*Primary Examiner* — Kaj K Olsen
*Assistant Examiner* — Elizabeth A Bolden
(74) *Attorney, Agent, or Firm* — Nixon & Vanderhye P.C.

(57) ABSTRACT

An optical glass that is an oxide glass having a very high refractive index in spite of its low-dispersion property, having excellent glass stability and having less susceptibility to coloring.

15 Claims, No Drawings

OPTICAL GLASS

This application is a divisional of application Ser. No. 13/339,397, filed Dec. 29, 2011, now U.S. Pat. No. 8,410,008 B2, which in turn is a divisional of application Ser. No. 12/491,541 10 filed Jun. 25, 2009, now U.S. Pat. No. 8,110,514 B2 which in turn claims priority to Japanese Application No(s). 2008-168804 filed Jun. 27, 2008 and 2009-138020, filed Jun. 9, 2009, the entire contents of each of which are hereby incorporated by reference.

TECHNICAL FIELD

This invention relates to an optical glass having high-refractivity low-dispersion properties, a press-molding glass gob formed of the above glass, an optical element formed of the above glass, a process for producing an optical element and a process for producing an optical element blank.

BACKGROUND ART

When combined with a lens formed of an ultra-low dispersion glass, a lens formed of a high-refractivity low-dispersion glass enables the downsizing of an optical system while correcting chromatic aberration. It hence occupies a very important place as an optical element to constitute an image-sensing optical system or a projection optical system such as a projector.

Patent Document 1 discloses such a high-refractivity low-dispersion glass.

PRIOR ART DOCUMENT

Patent Document

[Patent Document 1] JP55-60039A

SUMMARY OF THE INVENTION

Problems to be Solved by the Invention

Meanwhile, in a high-refractivity low-dispersion glass, the content of components for imparting high refractivity is relatively increased, and the content of components for forming a glass network is relatively increased, so that the glass is degraded in stability and involves a problem that it is easily devitrified during its production process.

Further, there is another problem that with an increase in the content of components for imparting high refractivity, the coloring of a glass is intensified.

It is an object of this invention to provide an optical glass having a very high refractive index in spite of its low-dispersion property, having excellent glass stability and having less susceptibility to coloring; a press-molding glass gob and an optical element blank each formed of the above optical glass; and processes for producing an optical element blank and an optical element.

Means to Solve the Problems

The present inventors have made diligent studies for achieving the above object, and as a result, it has been found that the above object can be achieved by an optical glass having a specified glass composition, refractive index and Abbe's number. On the basis of this finding, this invention has been accordingly completed.

That is, this invention provides (1) an optical glass that is an oxide glass and that comprises, by cationic %, 0 to 30% of $Si^{4+}$,
10 to 55% of $B^{3+}$,
less than 5% of total of $Li^+$, $Na^+$ and $K^+$,
less than 5% of total of $Mg^{2+}$, $Ca^{2+}$ and $Sr^{2+}$,
0 to 8% of $Ba^{2+}$,
0.1 to 15% of $Zn^{2+}$,
10 to 50% of $La^{3+}$,
0 to 20% of $Gd^{3+}$,
0 to 15% of $Y^{3+}$,
0 to 10% of $Yb^{3+}$,
0 to 20% of $Zr^{4+}$,
0.1 to 22% of $Ti^{4+}$,
0 to 20% of $Nb^{5+}$,
0 to 8% of $Ta^{5+}$,
0 to 5% of $W^{6+}$,
0 to 8% of $Ge^{4+}$,
0 to 10% of $Bi^{3+}$, and
0 to 10% of $Al^{3+}$, the cationic ratio of the content of $Si^{4+}$ to the content of $B^{3+}$, $Si^{4+}/B^{3+}$, being less than 1.0, the total content of $Nb_2O_5$ and $Ta_2O_5$ as oxides being less than 14 mass %, the optical glass having a refractive index nd of 1.92 to 2.2 and an Abbe's number vd of 25 to 45, (2) an optical glass recited in the above (1), which has a glass transition temperature Tg of 630° C. or higher, (3) an optical glass as recited in the above (1) or (2), which has a coloring degree λ70 of less than 470 nm, (4) an optical glass as recited in any one of the above (1) to (3), which has a partial dispersion ratio Pg,F and an Abbe's number vd which satisfy the relationship of the following expression (1), $$Pg,F \leq -0.0017 \times vd + 0.660 \quad (1)$$

(5) a press-molding glass gob formed of the optical glass recited in any one of the above (1) to (4), (6) an optical element which is formed of the optical glass recited in any one of the above (1) to (4), (7) a process for producing an optical element blank to be completed into an optical element by grinding and polishing, which comprises softening the press-molding glass gob recited in the above (5) by heating, and press-molding it, (8) a process for producing an optical element blank to be completed into an optical element by grinding and polishing, which comprises melting a glass raw material and press-molding the thus-obtained molten glass to produce an optical element blank formed of the optical glass recited in any one of the above (1) to (4), and (9) a process for producing an optical element, which comprises grinding and polishing the optical glass blank recited in the above (7) or (8).

Effect of the Invention

According to this invention, there can be provided an optical glass having a remarkably high refractive index in spite of its low dispersion like a refractive index nd of 1.92 or more and an Abbe's number vd of 25 or more, having excellent glass stability and being less susceptible to coloring; a press-molding glass gob and an optical element blank formed of the above glass each; and processes for producing an optical element blank and an optical element.

According to the above optical element and an optical element made from the above press-molding glass gob or the above optical glass blank, for example, a lens, there can be also provided a downsized optical system for correcting chromatic aberration by combining it with a lens formed of a high-refractivity high-dispersion glass.

According to a preferred embodiment of the optical glass of this invention, there can be also provided an optical glass which has the above optical properties and at the same time has a small partial dispersion ratio Pg,F as compared with a glass having an equal Abbe's number νd and which is suitable for chromatic aberration correction of a high order. When the above properties are utilized, there can be also provided an optical element that is suitable for chromatic aberration correction of a high order by combining it with an optical element formed of a high-refractivity high-dispersion glass.

EMBODIMENTS FOR PRACTICING THE INVENTION

[Optical Glass]

First, the optical glass of this invention will be explained.

The optical glass of this invention is an oxide glass and comprises, by cationic %, 0 to 30% of $Si^{4+}$,
10 to 55% of $B^{3+}$,
less than 5% of total of $Li^+$, $Na^+$ and $K^+$,
less than 5% of total of $Mg^{2+}$, $Ca^{2+}$ and $Sr^{2+}$,
0 to 8% of $Ba^{2+}$,
0.1 to 15% of $Zn^{2+}$,
10 to 50% of $La^{3+}$,
0 to 20% of $Gd^{3+}$,
0 to 15% of $Y^{3+}$,
0 to 10% of $Yb^{3+}$,
0 to 20% of $Zr^{4+}$,
0.1 to 22% of $Ti^{4+}$,
0 to 20% of $Nb^{5+}$,
0 to 8% of $Ta^{5+}$,
0 to 5% of $W^{6+}$,
0 to 8% of $Ge^{4+}$,
0 to 10% of $Bi^{3+}$, and
0 to 10% of $Al^{3+}$, the cationic ratio of the content of $Si^{4+}$ to the content of $B^{3+}$, $Si^{4+}/B^{3+}$, being less than 1.0, the total content of $Nb_2O_5$ and $Ta_2O_5$ as oxides being less than 14 mass %, the optical glass having a refractive index nd of 1.92 to 2.2 and an Abbe's number νd of 25 to 45.

(Reasons for Limitation of Compositional Ranges)

The reasons for limiting the above compositional ranges will be explained, while component contents and total contents by % hereinafter stand for component contents and total contents by cationic % unless otherwise specified.

$Si^{4+}$ is a network-forming cation and is also a component effective for maintaining glass stability, maintaining a viscosity suitable for shaping a molten glass and improving chemical durability. When the content thereof exceeds 30%, it is difficult to achieve the predetermined refractive index, and the liquidus temperature and glass transition temperature increase. Further, there are caused problems that the predetermined Abbe's number is difficult to achieve, that the glass meltability is deteriorated and that the devitrification resistance is deteriorated. The content of $Si^{4+}$ is hence limited to 0 to 30%. The upper limit of the $Si^{4+}$ content is preferably 25%, more preferably 23%, still more preferably 20%, yet more preferably 18%, further more preferably 15%, still further more preferably 12%. For obtaining the above effects produced by $Si^{4+}$ contained, the lower limit of the $Si^{4+}$ content is preferably 1%, more preferably 3%, still more preferably 4%, yet more preferably 5%, further more preferably 6%.

$B^{3+}$ is a network-forming cation and is also an essential component effective for maintaining glass meltability, decreasing the liquidus temperature, improving the glass stability and achieving lower dispersion. When the content thereof is less than 10%, the glass stability decreases, and the above effects can be no longer produced. When it exceeds 55%, the predetermined refractive index is difficult to achieve, and the chemical durability decreases. The content of $B^{3+}$ is hence limited to 10 to 55%. The upper limit of the $B^{3+}$ content is preferably 50%, more preferably 48%, still more preferably 45%, yet more preferably 43%, further more preferably 40%, still further more preferably 35%, yet further more preferably 32%, further more preferably 30%. The lower limit of the $B^{3+}$ content is preferably 13%, more preferably 15%, still more preferably 18%, yet more preferably 20%, further more preferably 21%, still further more preferably 22%.

For decreasing the liquidus temperature, improving the devitrification resistance, improving the meltability and maintaining the viscosity suitable for molding while maintaining the low dispersion property, the cationic ratio of the $Si^{4+}$ content to the content of $B^{3+}$, $Si^{4+}/B^{3+}$, is adjusted to less than 1. The upper limit of the cationic ratio $Si^{4+}/B^{3+}$ is preferably 0.5. The lower limit of the cationic ratio $Si^{4+}/B^{3+}$ is preferably 0.03.

$Li^+$, $Na^+$ and $K^+$ are optional components for improving the meltability and decreasing the glass transition temperature. When the total content of $Li^+$, $Na^+$ and $K^+$ is 5% or more, it is difficult to achieve the predetermined refractive index, the liquidus temperature increases, and the glass is deteriorated in stability and chemical durability. The total content of $Li^+$, $Na^+$ and $K^+$ is hence limited to less than 5%. The total content of $Li^+$, $Na^+$ and $K^+$ is preferably in the range of less than 3%, more preferably less than 2%, still more preferably less than 1%, and it is yet more preferred to introduce none of the above alkali metal components.

$Mg^{2+}$, $Ca^{2+}$ and $Sr^{2+}$ work to improve the glass meltability and to decrease the glass transition temperature Tg. Further, when they are introduced into the glass in the form of a sulfate or nitrate, a defoaming effect is also produced. However, when the total content of $Mg^{2+}$, $Ca^{2+}$ and $Sr^{2+}$ is 5% or more, the liquidus temperature increases and the devitrification resistance is deteriorated. Moreover, the refractive index decreases, and the chemical durability deteriorates. The total content of $Mg^{2+}$, $Ca^{2+}$ and $Sr^{2+}$ is hence limited to less than 5%. The total content of $Mg^{2+}$, $Ca^{2+}$ and $Sr^{2+}$ is preferably in the range of less than 3%, more preferably less than 2%, still more preferably less than 1%. It is further more preferred to introduce none of the alkaline earth metal components.

$Ba^{2+}$ improves the glass meltability, and when introduced in the form of a carbonate or nitrate, it can also produce a defoaming effect. However, when the content of $Ba^{2+}$ exceeds 8%, the liquidus temperature increases, and the glass stability decreases. It is also difficult to achieve the predetermined refractive index. Further, the chemical durability deteriorates. The content of $Ba^{2+}$ is hence limited to 0 to 8%. The content of $Ba^{2+}$ is preferably in the range of 0 to 7%, more preferably 0 to 6%, still more preferably 0 to 5%. For achieving the objects of this invention, the content of $Ba^{2+}$ may be limited to 3% or less, may be limited to 2% or less, may be limited to 1% or less, and may be limited to zero.

$Zn^{2+}$ is an essential component useful for achieving high-refractivity low-dispersion properties, and it works to improve the glass in meltability and devitrification resistance and to decrease the liquidus temperature and the glass transition temperature. When the content thereof is less than 0.1%, the refractive index may decrease, the liquidus temperature may increase or the devitrification resistance may deteriorate. On the other hand, when the above content exceeds 15%, it is difficult to achieve the predetermined refractive index. The content of $Zn^{2+}$ is hence limited to 0.1 to 15%. The upper limit of the content of $Zn^{2+}$ is preferably 14%, more preferably 13%, still more preferably 12%, yet more preferably 11%, further more preferably 10%, still further more preferably 7%, yet further more preferably 6%, further more preferably 5%. The lower limit of the content of $Zn^{2+}$ is preferably 0.3%, more preferably 0.5%, still more preferably 1%.

$La^{3+}$ is essential for achieving the high-refractivity low-dispersion properties and also works to improve the chemical durability. When the content thereof is less than 10%, it is difficult to achieve the predetermined refractive index. When it exceeds 50%, the liquidus temperature increases, and the devitrification resistance deteriorates. The content of $La^{3+}$ is hence limited to 10 to 50%. The upper limit of the content of $La^{3+}$ is preferably 48%, more preferably 45%, still more preferably 43%, yet more preferably 40%, further more preferably 38%, still further more preferably 37%, yet further more preferably 36%, further more preferably 35%. The lower limit of the content of $La^{3+}$ is preferably 13%, more preferably 15%, still more preferably 18%, yet more preferably 20%, further more preferably 21%, still further more preferably 22%.

When being co-present with $La^{3+}$, $Gd^{3+}$ works to decrease the liquidus temperature, to improve the devitrification resistance to a great extent and also to improve the chemical durability. However, when the content thereof exceeds 20%, the liquidus temperature increases, and the devitrification resistance deteriorates. The content of $Gd^{3+}$ is hence limited to 0 to 20%. The upper limit of the content of $Gd^{3+}$ is preferably 18%, more preferably 15%, still more preferably 13%, yet more preferably 12%, further more preferably 10%, still further more preferably 9%, yet further more preferably 8%, further more preferably 7%. The lower limit of the content of $Gd^{3+}$ is preferably 0.1%, more preferably 0.5%, still more preferably 1%, further more preferably 2%.

When being co-present with $La^{3+}$, $Y^{3+}$ also works to decrease the liquidus temperature, to improve the devitrification resistance to a great extent and to improve the chemical resistance. However, when the content thereof exceeds 15%, the liquidus temperature increases, and the devitrification resistance deteriorates. The content of $Y^{3+}$ is hence limited to 0 to 15%. The content of $Y^{3+}$ is preferably in the range of 0 to 13%, more preferably 0 to 10%, still more preferably 0 to 8%, yet more preferably 0 to 7%, further more preferably 0 to 5%, still further more preferably 0 to 4%.

When being co-present with $La^{3+}$, $Yb^{3+}$ also works to decrease the liquidus temperature, to improve the devitrification resistance to a great extent and to improve the chemical resistance. When the content thereof exceeds 10%, the liquidus temperature increases, and the devitrification resistance deteriorates. The content of $Yb^{3+}$ is hence limited to 0 to 10%. The content of $Yb^{3+}$ is preferably in the range of 0 to 5%, more preferably 0 to 3%, still more preferably 0 to 1%. It is yet more preferred to introduce no $Yb^{3+}$.

$Zr^{4+}$ works to increase the refractive index and to improve the chemical durability. Even when introduced in a small amount, it can produce excellent effects. However, when the content thereof exceeds 20%, the glass transition temperature and the liquidus temperature increase, and the devitrification resistance deteriorates. The content of $Zr^{4+}$ is hence limited to 0 to 20%. The upper limit of the content of $Zr^{4+}$ is preferably 18%, more preferably 16%, still more preferably 14%, yet more preferably 12%, further preferably 10%, still further preferably 8%, yet further preferably 7%. The lower limit of the content of $Zr^{4+}$ is preferably 1%, more preferably 2%, still more preferably 3%.

$Ti^{4+}$ works to increase the refractive index and to improve the chemical durability and devitrification resistance. When the content thereof is less than 0.1%, the above effects cannot be produced. When it exceeds 22%, it is difficult to obtain the predetermined Abbe's number, and the glass transition temperature and the liquidus temperature increase. Further, the devitrification resistance deteriorates. The content of $Ti^{4+}$ is hence limited to 0.1 to 22%. The upper limit of the content of $Ti^{4+}$ is preferably 21%, more preferably 20%, still more preferably 19%, yet more preferably 18%, further more preferably 17%, still further more preferably 16%, yet further more preferably 15%. The lower limit of the content of $Ti^{4+}$ is preferably 1%, more preferably 3%, still more preferably 5%, yet more preferably 8%, further more preferably 10%, still further more preferably 11%, yet further more preferably 12%.

In particular, for obtaining a refractive index nd of 1.968 or more, the content of $Ti^{4+}$ is adjusted to preferably 5% or more, more preferably, to 10% or more, still more preferably, to 12% or more, yet more preferably, to 13% or more, further more preferably, to 14% or more. However, for inhibiting the glass transition temperature and liquidus temperature from increasing and inhibiting the devitrification resistance from deteriorating even when the refractive index nd is made to be 1.968 or more, the content of $Ti^{4+}$ is adjusted preferably to 21% or less, more preferably, to 20% or less, still more preferably, to 19% or less.

$Nb^{5+}$ increases the refractive index and also works to decrease the liquidus temperature and to improve the devitrification resistance. When the content thereof exceeds 20%, the liquidus temperature increases, the devitrification resistance deteriorates, and it is difficult to achieve the predetermined Abbe's number. Moreover, the coloring of the glass is intensified. The content of $Nb^{5+}$ is hence limited to 0 to 20%. The upper limit of the content of $Nb^{5+}$ is preferably 18%, more preferably 16%, still more preferably 14%, yet more preferably 12%, further more preferably 10%, still further more preferably 9%, yet further more preferably 8%. The lower limit of the content of $Nb^{5+}$ is preferably 0.1%, more preferably 1%, still more preferably 2%, yet more preferably 3%.

$Ta^{5+}$ achieves the high-refractivity low-dispersion properties and also works to improve the glass stability. However, it is an expensive component, and when the content thereof exceeds 8%, the liquidus temperature increases, and the devitrification resistance decreases. The content of $Ta^{5+}$ is hence limited to 0 to 8%. The content of $Ta^{5+}$ is preferably in the range of 0 to 6%, more preferably 0 to 4%, still more preferably 0 to 3%, yet more preferably 0 to 2.5%, further more preferably 0 to 2%, still further more preferably 0 to 1%. It is particularly preferred to introduce no $Ta^{5+}$.

In the optical glass of this invention, the total content of $Nb_2O_5$ and $Ta_2O_5$ as oxides of $Nb^{5+}$ and $Ta^{5+}$ is limited to less than 14 mass % for inhibiting the liquidus temperature from increasing and maintaining the devitrification resistance. From the above viewpoint, the total content of $Nb_2O_5$ and $Ta_2O_5$ is preferably in the range of 13 mass % or less.

$W^{6+}$ is an optional component that increases the refractive index, that decreases the liquidus temperature and that serves to improve the devitrification resistance. However, when its content exceeds 5%, the liquidus temperature increases, the devitrification resistance deteriorates, and the coloring of the glass is intensified. The content of $W^{6+}$ is hence limited to 0 to 5%. The content of $W^{6+}$ is preferably in the range of 0 to 4%, more preferably 0 to 3%, still more preferably 0 to 2%, yet more preferably 0 to 1%. It is further more preferred to introduce no $W^{6+}$.

$Ge^{4+}$ is a network-forming cation and also works to increase the refractive index. It is hence a component that maintains the glass stability and at the same can increase the refractive index. Since, however, it is a very expensive component, it is desirable to keep the content thereof together with the content of a Ta component from increasing in view of a cost. In this invention, the glass composition is determined as described above. Therefore, even when the content of $Ge^{4+}$ is kept at the level of 8% or less, both the accomplishment of the predetermined optical properties and the accomplishment of excellent glass stability can be satisfied. The content of $Ge^{4+}$ is hence limited to 0 to 8%.

The content of $Ge^{4+}$ is preferably in the range of 0 to 6%, more preferably 0 to 4%, still more preferably 0 to 2%, yet more preferably 0 to 1%. In particular, the optical glass of this invention is preferably a glass containing no $Ge^{4+}$, i.e., a Ge-free glass.

$Bi^{3+}$ increases the refractive index and also works to increase the glass stability. However, the content thereof exceeds 10%, the light transmittance in a visible light region decreases. The content of $Bi^{3+}$ is hence limited to 0 to 10%. The content of $Bi^{3+}$ is preferably in the range of 0 to 8%, more preferably 0 to 6%, still more preferably 0 to 4%, yet more preferably 0 to 2%, further more preferably 0 to 1%, and it is particularly preferred to introduce no $Bi^{3+}$.

$Al^{3+}$ works to improve the glass stability and the chemical durability so long as its content is small. However, when the content thereof exceeds 10%, the liquidus temperature increases, and the devitrification resistance deteriorates. The content of $Al^{3+}$ is hence limited to 0 to 10%. The content of $Al^{3+}$ is preferably in the range of 0 to 8%, more preferably 0 to 6%, still more preferably 0 to 4%, yet more preferably 0 to 2%, further more preferably 0 to 1%, and it is particularly preferred to introduce no $Al^{3+}$.

Sb can be added as a refiner, and it works to inhibit the decrease of light transmittance caused by the inclusion of impurities such as Fe, etc., when it is added in a small amount. However, when it is added in an amount of over 1 mass % as $Sb_2O_2$ based on the glass composition excluding the $Sb_2O_2$, the glass is colored, or during press molding, it promotes the deterioration of molding surface of a press mold due to its strong oxidizing activity. The amount of Sb as $Sb_2O_2$ based on the glass composition excluding the $Sb_2O_2$ is preferably 0 to 1 mass %, more preferably 0 to 0.5 mass %, still more preferably 0 mass %.

Sn can be also added as a refiner. However, when it is added in an amount of over 1 mass % as $SnO_2$ based on the glass composition excluding the $SnO_2$, the glass is colored, or during press molding, it promotes the deterioration of molding surface of a press mold due to its oxidizing activity. Therefore, the amount of Sn as $SnO_2$ based on the glass composition excluding the $SnO_2$ is preferably 0 to 1 mass %, more preferably 0 to 0.5 mass %.

Besides this, a small amount of Ce oxide, sulfate, nitrate or chloride may be added as a refiner.

The optical glass of this invention achieves the high-refractivity low-dispersion properties while maintaining the glass stability, and it obviates the necessity of incorporating components such as Lu, Hf, Ga, In and Sc. Since Lu, Hf, Ga, In and Sc are also expensive components, it is preferred to keep the content of each of $LU^{3+}$, $Hf^{4+}$, $Ga^{3+}$, $In^{3+}$ and $Sc^{3+}$ at 0 to 1%, and it is more preferred to keep each content at 0 to 0.5%.

And, to introduce no $LU^{3+}$, to introduce no $Hf^{4+}$, to introduce no $Ga^{3+}$, to introduce no $In^{3+}$ and to introduce no $Sc^{3+}$ are particularly preferred.

Further, when environmental effects are taken into account, it is preferred to introduce none of As, Pb, U, Th, Te and Cd.

Further, for making the most of the excellent light transmissivity of the glass, it is preferred to introduce none of coloring-causing substances such as Cu, Cr, V, Fe, Ni, Co, etc.

The optical glass of this invention is an oxide glass, and its anion components are substantially composed of $O^{2-}$. While a small amount of $Cl^-$ or $F^-$ can be added as a refiner as described above, the content of $O^{2-}$ is preferably 98 anionic %, more preferably 99 anionic %, still more preferably 99.5 anionic %, yet more preferably 100 anionic %.

(Optical Properties of Optical Glass)

The refractive index nd of the optical glass of this invention is 1.92 to 2.2. The lower limit of the refractive index nd is preferably 1.930, more preferably 1.935, still more preferably 1.940. The upper limit of the refractive index nd is preferably 2.0, more preferably 1.995, still more preferably 1.990. It is effective for enhancing the function of an optical element and downsizing the same to increase the refractive index, and it is advantageous for improving the glass stability to restrict the upper limit of the refractive index.

The Abbe's number vd of the optical glass of this invention is 25 to 45. When combined with a lens formed of a glass having a high dispersion property to correct the chromatic aberration, a glass having a larger Abbe's number vd is advantageous. From this point of view, the lower limit of the Abbe's number vd is preferably 26, more preferably 27, still more preferably 28, yet more preferably 29. On the other hand, when the upper limit of the Abbe's number vd is moderated, it works advantageously to maintain and improve the glass stability. From this point of view, the upper limit of the Abbe's number vd is preferably 43, more preferably 40, still more preferably 38, yet more preferably 36, further more preferably 35, still further more preferably 34, yet more further preferably 33, further more preferably 32.

An optical glass that is imparted with by far higher refractivity is suitable as a material for an optical element suitable for downsizing optical systems such as an image-sensing optical system and a projection optical system and for enhancing the function thereof. Further, when a lens having the same focal length is produced, the absolute value of curvature of the optical-function surface of the lens can be decreased (the curve can be moderated), so that the optical glass of this invention is advantageous for shaping and processing a lens. On the other hand, when an optical glass is imparted with by far higher refractivity, it shows the tendency of its thermal stability decreasing or its coloring being intensified, that is, its light transmittance decreasing in a visible short wavelength region. From the viewpoint of use and productivity, therefore, the optical glass of this invention is broadly classified into one for a case where a higher refractive index has priority and one for a case where an improvement in thermal stability or a decrease in coloring has priority, and can be used depending upon such a use.

In the optical glass of this invention, when high refractivity has priority, the lower limit of the refractive index nd is 1.966, more preferably 1.967, still more preferably 1.968, and in this case, the Abbe's number vd is preferably in the range of 25 to 34, more preferably 26 to 33, still more preferably 27 to 32. From the viewpoint of maintenance of the glass stability even when high refractivity has priority, the refractive index nd is adjusted preferably to 2.200 or less, more preferably, to 2.100 or less, still more preferably, to 2.050 or less. In the optical glass of this invention, the optical glass having a refractive index nd of 1.966 or more will be referred to as optical glass A, and the optical glass having a refractive index nd of less than 1.966 will be referred to as optical glass B.

The already explained content range of $Ti^{4+}$ which is preferred for obtaining a refractive index nd of 1.968 or more can apply to the content range of $Ti^{4+}$ which is preferred in the optical glass A.

The optical glass of this invention is a glass having a small partial dispersion ratio when the Abbe's number νd is fixed, so that optical elements formed of the optical glass of this invention such as a lens are suitable for chromatic aberration correction of a high order.

The above partial dispersion ratio Pg,F is represented by (ng−nF)/(nF−nc), in which ng, nF and nc are refractive indices to g ray, F ray and c ray.

For providing an optical glass suitable for chromatic aberration correction of a high order, the optical glass of this invention is preferably a glass of which the partial dispersion ratio Pg,F and the Abbe's number νd satisfy the following expression (1), more preferably a glass of which the partial dispersion ratio Pg,F and the Abbe's number νd satisfy the following expression (2), still more preferably a glass of which the partial dispersion ratio Pg,F and the Abbe's number νd satisfy the following expression (3).

$$Pg,F \leq -0.0017 \times vd + 0.660 \quad (1)$$

$$Pg,F \leq -0.0017 \times vd + 0.655 \quad (2)$$

$$Pg,F \leq -0.0017 \times vd + 0.650 \quad (3)$$

The optical glass A and the optical glass B, in particular the optical glass B, are/is preferred embodiment(s) for satisfying one of the above expressions (1) to (3).

The light transmittance of the optical glass of this invention will be explained below.

The optical glass of this invention exhibits a high light transmittance over a broad wavelength region of the visible region. In a preferred embodiment of this invention, the optical glass of this invention exhibits a coloring degree represented by a λ70 of 470 nm or less. The λ70 is preferably in the range of 465 nm or shorter, more preferably 460 nm or shorter, still more preferably 455 nm or shorter, yet more preferably 450 nm or shorter, further more preferably 445 nm or shorter, still further more preferably 440 nm or shorter.

The above λ70 refers to a wavelength at which the light transmittance becomes 70% in the range of wavelength 280 to 700 nm. The above light transmittance refers to a spectral transmittance obtained by using a glass sample that is polished to have a thickness of 10.0±0.1 mm and has so-polished surfaces in parallel with each other and causing light to enter the polished surface in the direction perpendicular to the above polished surface, that is, Iout/Iin in which Iin is the intensity of light that enters the above sample and Iout is the intensity of light that is transmitted past the above sample. The spectral transmittance includes a reflection loss of light on the sample surface. The above "polished" means that a surface is flattened to ensure a state where the surface has a surface roughness fully small relative to wavelengths in the measurement wavelength region.

In a preferred embodiment of the optical glass of this invention, the light transmittance exceeds 70% in a visible light region on the side of wavelengths longer than λ70. Like λ70, λ5 can be also defined as follows. λ5 is a wavelength at which the spectral transmittance becomes 5%.

The λ5 is preferably in the range of 380 nm or shorter, more preferably 375 nm or shorter, still more preferably 365 nm or shorter.

The above spectral transmittance is measured in the wavelength range of 280 to 700 nm as described above. When the wavelength increases from λ5, the light transmittance increases, and when it reaches λ70, a high light transmittance of 70% or more is maintained up to a wavelength of 700 nm.

The optical glass A and the optical glass B, in particular, the optical glass B, are/is preferred embodiment(s) for obtaining properties with regard to the above λ70 and λ5.

As will be described later, a lens of the optical glass of this invention can provide a downsized, highly functional optical system having excellent chromatic aberration correction capability when combined with a lens formed of an ultra-low dispersion optical glass. Conventionally, a chromatic aberration correction optical system uses a lens formed of a high-refractivity high-dispersion glass in combination with a lens formed of an ultra-low dispersion glass. However, a high-refractivity high-dispersion glass contains a relatively large amount of components for imparting high-refractivity high-dispersion properties such as $TiO_2$, $Nb_2O_5$, $Bi_2O_3$, $WO_3$, etc., and in some cases, no fully high light transmittance can be obtained on the short wavelength side in the visible light region. In a chromatic aberration correction optical system using a lens formed of an ultra-low dispersion glass and a lens formed of a high-refractivity high-dispersion glass, the transmittance of the lens formed of the high-refractivity high-dispersion glass to light on the short wavelength side in the visible light region, such as blue, decreases, and the visible light transmittance of the entire optical system decreases to that extent. When a lens formed of the optical glass of this invention is used in place of the lens formed of a high-refractivity high-dispersion glass, the light transmittance of the above chromatic aberration correction optical system in the visible region can be fully secured.

From this viewpoint, an optical glass having a λ5 in the above range is preferred in this invention.

(Glass Transition Temperature of Optical Glass)

The optical glass of this invention is suitable for forming a smooth optical-function surface by grinding and polishing. The suitability to cold processing such as cutting, polishing, etc., that is, cold processability has relationship to the glass transition temperature while it is indirect. A glass having a low glass transition temperature is suitable for precision press-molding rather than cold processing, while a glass having a high glass transition temperature is suitable for cold processing rather than precision press-molding and is excellent in cold processability. In this invention, therefore, it is preferred to keep the glass transition temperature from decreasing to excess, and it is preferred to adjust it to higher than 630° C., it is more preferred to adjust it to 640° C. or higher, and it is still more preferred to adjust it to 660° C. or higher. However, when the glass transition temperature is too high, the heating temperature during the molding of a glass by re-heating and softening it increases, and a mold used for the molding is greatly deteriorated. Further, the annealing temperature increases, and an annealing furnace is greatly deteriorated and abraded. It is hence preferred to adjust the glass transition temperature to 750° C. or lower, it is more preferred to adjust it to 740° C. or lower, it is still more preferred to adjust it to 730° C. or lower, it is yet more preferred to adjust it to 725° C. or lower, and it is further more preferred to adjust it to 710° C. or lower.

(Thermal Stability of Optical Glass)

In a preferred embodiment of this invention, the optical glass of this invention has a liquidus temperature of 1,220° C. or lower. Further, the optical glass A preferably has a liquidus temperature in the range of 1,210° C. or lower, more preferably 1,200° C. or lower. The optical glass B preferably has a liquidus temperature in the range of 1,200° C. or lower, more preferably 1,190° C. or lower. Since the optical glass of this invention has excellent thermal stability as described above in spite of being a high-refractivity low-dispersion glass, it can be stably produced as a high-quality optical glass. Further, since the dissolving of platinum or platinum alloy constituting a crucible into a glass can be suppressed by decreasing the melting temperature while preventing devitrification, the intensifying of coloring of the glass by platinum ion or the inclusion of platinum foreign matter can be suppressed or prevented.

(Process for Producing Optical Glass)

The process for producing an optical glass, provided by this invention, will be explained below. For example, compound raw materials in the form of powders or cullet raw materials are weighed and formulated so as to give an intended glass composition, these materials are supplied into a melting furnace made of platinum alloy, and then they are heated and melted. After the above raw materials are completely melted to form a glass, this molten glass is temperature-increased to refine it. The refined molten glass is stirred with a stirrer to homogenize it, and the homogenized glass is continuously supplied to a glass discharge pipe to cause it to flow out, followed by rapid cooling to solidness to give a glass shaped material.

For obtaining a glass that is homogeneous, less colored and stabilized with regard to various properties including optical properties, it is desirable to bring the melting temperature of the optical glass into the range of 1,250 to 1,400° C.

The press-molding glass gob of this invention will be explained below.

(Press-Molding Glass Gob)

The press-molding glass gob of this invention is characteristically formed of the above optical glass of this invention. The gob has a form that easily permits press-molding, depending upon the form of an intended press-molded product. The mass of the gob is determined depending upon a press-molded product. Since this invention uses the glass excellent in stability, the glass does not easily undergo devitrification when it is press-molded by re-heating and softening, and molded products having a high quality can be stably produced.

Production examples of the press-molding glass gob are as follows.

In a first production example, a molten glass flowing out of a discharge pipe is continuously cast into a mold that is horizontally arranged below the discharge pipe, and shaped in the form of a plate having a constant thickness. The shaped glass is continuously withdrawn in the horizontal direction through an opening portion provided on a side surface of the mold. The plate-like glass shaped material is withdrawn by means of a belt conveyor. When the shaped glass is withdrawn with keeping a constant withdrawing speed of the belt conveyor such that the glass shaped material has a constant thickness, whereby the glass shaped material that can be obtained has a constant thickness and a constant width. The glass shaped material is carried into an annealing furnace by means of a belt conveyor and gradually cooled. The gradually cooled glass shaped material is cut or split in the thickness direction, and a cut or split piece is formed into a press-molding glass gob by polishing or barrel-polishing it.

In a second production example, a molten glass is cast into a cylindrical mold in place of the above mold, to shape a cylindrical glass shaped material. The glass shaped material formed in the mold is withdrawn from an opening portion of the mold bottom at a constant rate in the vertically downward direction. The withdrawing rate can be determined such that the liquid level of the molten glass in the mold is constant. After gradually cooled, the glass shaped material is cut or split and formed into a press-molding glass gob by polishing or barrel-polishing it.

In a third production example, a molding machine is arranged below the discharge pipe, the molding machine having a turntable and a plurality of shaping molds arranged on the circumferential region of the turntable at even intervals, the turn table is index-turned, one of stop positions of the shaping molds is determined to be a position to supply molten glass (which will be referred to as "casting position"), molten glass is supplied, the supplied molten glass is formed into a glass shaped material, and the glass shaped material is taken out at a predetermined shaping mold stop position (taking-out position) different from the casting position. It can be determined by taking account of the turn speed of the turn table, the cooling rate of the glass, etc., which stop position should be selected as the taking-out position. The shaping mold in the casting position can be supplied with molten glass by a method in which molten glass is dropped from the glass flow outlet of the discharge pipe and a glass drop is received with the above shaping mold, a method in which the shaping mold that is at a stop in the casting position is caused to come near to the glass flow outlet to support the lower end of the molten glass flow, a narrow portion is formed somewhere in the flow of the glass, the shaping mold is rapidly moved in the vertically downward direction timely as predetermined to separate molten glass and the molten glass is received on the shaping mold, a method in which the flow of the molten glass that is flowing out is cut with a cutting blade, and a separated molten glass mass is received with a shaping mold at a stop in the casting position, or the like.

For the shaping of a glass on/above the shaping mold, known methods can be employed. Above all, when a glass is shaped while it is caused to float by ejecting a gas upward from the shaping mold to apply upward gas pressure to the glass mass, this method can prevent creases from forming on the glass shaped material surface or can prevent the glass shaped material from cracking by its contact to the shaping mold.

The glass shaped material can have a spherical form, a spheroidal form, a form having one rotation-symmetrical axis and having two planes facing in the rotation-symmetrical axis direction and facing outwardly in the form of a convex each, etc., depending upon the selection of a shaping mold form and the way of ejecting the above gas. These forms are suitable as/for a glass gob to be press-molded for producing an optical element such as a lens, etc., or an optical element blank. The thus-obtained glass shaped material can be used directly as a press-molding glass gob, or formed into a press-molding glass gob by polishing or barrel-polishing its surface.

[Optical Element]

The optical element of this invention will be explained below.

The optical element of this invention is characteristically formed of the above optical glass of this invention. The optical glass of this invention has high-refractivity low-dispersion properties, and the contents of expensive components such as Ta, Ge, etc., therein are limited to relatively small contents or zero, so that there can be provided optically valuable optical elements such as various lenses and prisms at a low cost.

Examples of the lenses include various lenses having a spherical or aspherical lens surface each, such as a concave meniscus lens, a convex meniscus lens, a biconvex lens, a biconcave lens, a plano-convex lens, a plano-concave lens, etc.

When combined with a lens formed of a low-dispersion glass, these lenses can correct chromatic aberration and are hence suitable as lenses for chromatic aberration correction. Further, they are lenses effective for downsizing an optical system.

Further, a prism formed of the optical glass of this invention has a high refractive index, and when incorporated into an image-sensing optical system, an optical path is turned in a desired direction by bending an optical path, whereby a downsized optical system having a wide angle of view can be achieved.

The optical-function surface of the optical element of this invention may be provided with a film for controlling light transmittance, such as an anti-reflection film, etc.

[Process for Producing Optical Element Blank]

The process for producing an optical element blank, provided by this invention, will be explained below.

The process for producing an optical element blank, provided by this invention, includes the following two embodiments.

(First Process for Producing Optical Element)

The first process for producing an optical element, provided by this invention, is a process for producing an optical element blank to be completed into an optical element by grinding and polishing, which comprises softened the above press-molding glass gob of this invention by heating and press-molding it.

The optical element blank is a glass shaped material having a form that is very similar to a form obtained by adding a processing margin to be removed by grinding and polishing to the form of an intended optical element.

For producing an optical element blank, there is prepared a press mold having a molding surface having a form that is the inverse of the form of the blank. The press mold is composed of mold members such as an upper mold member, a lower mold member and optionally a sleeve member, and the molding surfaces of the upper and lower mold members are so prepared as to have the above form, or when the sleeve member is used, the molding surface of the sleeve member is so prepared as to have the above form.

Then, a powdered mold release agent such as boron nitride is uniformly applied to the surface of the press-molding glass gob, the press-molding glass gob is heated to soften it and then introduced onto the lower mold member that is preheated, and it is pressed with the upper mold member facing the lower mold member to form an optical element blank.

Then, the optical element blank is removed from the press mold, taken out of the press mold and annealed. By this annealing treatment, a strain within the glass is reduced, and optical properties such as a refractive index, etc., are adjusted to predetermined values.

Heating conditions and press-molding conditions with regard to the glass gob and materials for forming the press mold can be selected from known conditions or materials. The above steps can be carried out in atmosphere.

(Second Process for Producing Optical Element)

The second process for producing an optical element, provided by this invention, is a process for producing an optical element blank to be completed into an optical element by grinding and polishing, which comprises melting glass raw materials to obtain a molten glass and press-molding the thus-obtained molten glass to produce an optical element blank formed of the above optical glass of this invention.

The press mold is composed of mold members such as an upper mold member, a lower mold member and optionally a sleeve member. The molding surface of the press mold is processed so as to have a form that is the inverse of the form of the optical element blank as described above.

A powdered mold release agent such as boron nitride is uniformly applied to the molding surface of the lower mold member, a molten glass obtained by melting glass raw materials according to the above-described process for producing an optical glass is caused to flow out on the molding surface of the lower mold member, and when the amount of the molten glass on the lower mold member reaches a predetermined amount, it is cut with cutting blades called shears. After a glass mass is so-obtained on the lower mold member, the lower mold member with the molten glass mass on it is moved to a position where the upper mold member stands by above, and the glass is pressed with the upper and lower mold members to shape it into an optical element blank.

Then, the optical element blank is removed from the press mold, taken out of the press mold and annealed. By this annealing treatment, a strain within the glass is reduced, and optical properties such as a refractive index, etc., are adjusted to predetermined values.

Heating conditions and press-molding conditions with regard to the glass gob and materials for forming the press mold can be selected from known conditions or materials. The above steps can be carried out in atmosphere.

The process for producing an optical element, provided by this invention, will be explained below.

(Process for Producing Optical Element)

The process for producing an optical element, provided by this invention, comprises grinding and polishing an optical element blank produced by the above process of this invention. Known methods can be applied to the grinding and polishing.

EXAMPLES

This invention will be explained further in detail with reference to Examples, while this invention shall not be limited by these Examples. The optical glass of this invention can be obtained by employing a method of adjusting contents of the above glass components in the light of glasses of these Examples.

Example 1

For obtaining oxide glasses Nos. 1 to 36 having compositions (indicated by cationic %) shown in Tables 1-1 to 1-4, nitrates, sulfates, hydroxides, oxides, boric acid, etc., were used as raw materials, and powders of these raw materials weighed and fully mixed to obtain a formulated raw material of each composition. For each composition, this formulated raw material was placed in a platinum crucible, heated at 1,400° C. and melted, and the thus-obtained molten glass was refined and stirred to obtain a homogeneous molten glass. This molten glass was cast into a preheated mold and rapidly cooled, and the cooled glass was held at a temperature around its glass transition temperature for 2 hours and gradually cooled. In this manner, optical glasses as oxide glass Nos. 1 to 36 were obtained. No precipitation of a crystal was found in any glass.

In the oxide glasses Nos. 1 to 36, anion components were totally $O^{2-}$. Further, Tables 2-1 to 2-3 show compositions of the oxide glasses Nos. 1 to 36 by mass %, and Tables 3-1 to 3-3 show them by mol %.

These glasses were measured for properties by the following methods. Tables 1-5 show the measurement results.

(1) Refractive index nd and Abbe's number vd

An optical glass cooled at a cooling rate of 30° C./hour was measured.

(2) Partial dispersion ratio Pg,F

An optical glass cooled at a cooling rate of 30° C./hour was measured for refractive indices ng, nF and nc, and it was calculated from these values.

(3) Glass transition temperature Tg

Measured with a thermomechanical analyzer under the condition of 4° C./minute as a temperature elevation rate.

(4) Liquidus temperature

A glass was placed in a furnace under heat at a predetermined temperature and held for 2 hours, and after it was cooled, an inside of the glass was observed through an optical microscope of 100 magnifications. A liquidus temperature was determined on the basis of whether a crystal was present or absent.

(5) Specific gravity

Measured according to an Archimedean method.

(6) $\lambda 70$, $\lambda 5$

There was used a glass sample that was polished to have a thickness of $10.0\pm0.1$ mm and had the thus-polished surfaces in parallel with each other, light having intensity Iin was caused to enter the polished surface in the direction perpendicular to the above polished surface, light that was transmitted past the sample was measured for intensity Iout, a light transmittance Iout/Iin was calculated, and a wavelength at which the light transmittance became 70% was taken as $\lambda 70$, and a wavelength at which the light transmittance became 5% was taken as $\lambda 5$.

TABLE 1-1

| No. | | $Si^{4+}$ | $B^{3+}$ | $Li^+$ | $Na^+$ | $K^+$ | $Mg^{2+}$ | $Ca^{2+}$ | $Sr^{2+}$ |
|---|---|---|---|---|---|---|---|---|---|
| 1 | Cationic % | 10.48 | 27.80 | 0.00 | 0.00 | 0.00 | 0.00 | 0.00 | 0.00 |
| 2 | Cationic % | 10.48 | 27.80 | 0.00 | 0.00 | 0.00 | 0.00 | 0.00 | 0.00 |
| 3 | Cationic % | 10.48 | 27.80 | 0.00 | 0.00 | 0.00 | 0.00 | 0.00 | 0.00 |
| 4 | Cationio % | 10.48 | 27.80 | 0.00 | 0.00 | 0.00 | 0.00 | 0.00 | 0.00 |
| 5 | Cationic % | 10.48 | 27.80 | 0.00 | 0.00 | 0.00 | 0.00 | 0.00 | 0.00 |
| 6 | Cationic % | 10.48 | 27.80 | 0.00 | 0.00 | 0.00 | 0.00 | 0.00 | 0.00 |
| 7 | Cationic % | 10.48 | 27.80 | 0.00 | 0.00 | 0.00 | 0.00 | 0.00 | 0.00 |
| 8 | Cationic % | 10.48 | 27.80 | 0.00 | 0.00 | 0.00 | 0.00 | 0.00 | 0.00 |
| 9 | Cationic % | 10.48 | 27.80 | 0.00 | 0.00 | 0.00 | 0.00 | 0.00 | 0.00 |
| 10 | Cationic % | 10.48 | 27.80 | 0.00 | 0.00 | 0.00 | 0.00 | 0.00 | 0.00 |
| 11 | Cationic % | 10.48 | 28.76 | 0.00 | 0.00 | 0.00 | 0.00 | 0.00 | 0.00 |
| 12 | Cationic % | 10.48 | 27.80 | 0.00 | 0.00 | 0.00 | 0.00 | 0.00 | 0.00 |
| 13 | Cationic % | 10.48 | 27.80 | 0.00 | 0.00 | 0.00 | 0.00 | 0.00 | 0.00 |
| 14 | Cationic % | 10.48 | 27.80 | 0.00 | 0.00 | 0.00 | 0.00 | 0.00 | 0.00 |
| 15 | Cationic % | 10.48 | 27.80 | 0.00 | 0.00 | 0.00 | 0.00 | 0.00 | 0.00 |
| 16 | Cationic % | 10.48 | 27.80 | 0.00 | 0.00 | 0.00 | 0.00 | 0.00 | 0.00 |
| 17 | Cationic % | 10.48 | 27.80 | 0.00 | 0.00 | 0.00 | 0.00 | 0.00 | 0.00 |
| 18 | Cationic % | 10.48 | 28.76 | 0.00 | 0.00 | 0.00 | 0.00 | 0.00 | 0.00 |
| 19 | Cationic % | 10.48 | 27.80 | 0.00 | 0.00 | 0.00 | 0.00 | 0.00 | 0.00 |
| 20 | Cationic % | 10.48 | 27.80 | 0.00 | 0.00 | 0.00 | 0.00 | 0.00 | 0.00 |
| 21 | Cationic % | 10.48 | 27.80 | 0.00 | 0.00 | 0.00 | 0.00 | 0.00 | 0.00 |
| 22 | Cationic % | 10.48 | 27.76 | 0.00 | 0.00 | 0.00 | 0.00 | 0.00 | 0.00 |
| 23 | Cationic % | 10.48 | 26.76 | 0.00 | 0.00 | 0.00 | 0.00 | 0.00 | 0.00 |
| 24 | Cationic % | 10.48 | 26.76 | 0.00 | 0.00 | 0.00 | 0.00 | 0.00 | 0.00 |
| 25 | Cationic % | 10.48 | 24.76 | 0.00 | 0.00 | 0.00 | 0.00 | 0.00 | 0.00 |
| 26 | Cationic % | 10.48 | 23.76 | 0.00 | 0.00 | 0.00 | 0.00 | 0.00 | 0.00 |
| 27 | Cationic % | 10.48 | 23.76 | 0.00 | 0.00 | 0.00 | 0.00 | 0.00 | 0.00 |
| 28 | Cationic % | 10.48 | 23.76 | 0.00 | 0.00 | 0.00 | 0.00 | 0.00 | 0.00 |
| 29 | Cationic % | 10.48 | 23.76 | 0.00 | 0.00 | 0.00 | 0.00 | 0.00 | 0.00 |
| 30 | Cationic % | 10.48 | 23.26 | 0.00 | 0.00 | 0.00 | 0.00 | 0.00 | 0.00 |
| 31 | Cationic % | 10.48 | 23.76 | 0.00 | 0.00 | 0.00 | 0.00 | 0.00 | 0.00 |
| 32 | Cationic % | 10.48 | 26.76 | 0.00 | 0.00 | 0.00 | 0.00 | 0.00 | 0.00 |
| 33 | Cationic % | 7.98 | 26.86 | 0.00 | 0.00 | 0.00 | 0.00 | 0.00 | 0.00 |
| 34 | Cationic % | 7.96 | 28.00 | 0.00 | 0.00 | 0.00 | 0.00 | 0.00 | 0.00 |
| 35 | Cationic % | 7.96 | 28.00 | 0.00 | 0.00 | 0.00 | 0.00 | 0.00 | 0.00 |
| 36 | Cationic % | 7.96 | 28.00 | 0.00 | 0.00 | 0.00 | 0.00 | 0.00 | 0.00 |

TABLE 1-2

| No. | | $Ba^{2+}$ | $Zn^{2+}$ | $La^{3+}$ | $Gd^{3+}$ | $Y^{3+}$ | $Yb^{3+}$ | $Zr^{4+}$ | $Ti^{4+}$ |
|---|---|---|---|---|---|---|---|---|---|
| 1 | Cationic % | 4.96 | 3.44 | 23.26 | 3.00 | 1.10 | 0.00 | 4.81 | 15.08 |
| 2 | Cationic % | 4.96 | 3.44 | 24.26 | 3.00 | 1.10 | 0.00 | 4.81 | 15.08 |
| 3 | Cationic % | 3.96 | 3.44 | 25.26 | 3.00 | 1.10 | 0.00 | 4.81 | 15.08 |
| 4 | Cationic % | 3.96 | 3.44 | 25.26 | 4.00 | 1.10 | 0.00 | 4.81 | 14.08 |
| 5 | Cationic % | 3.96 | 3.44 | 25.26 | 5.00 | 1.10 | 0.00 | 4.81 | 13.08 |
| 6 | Cationic % | 3.06 | 3.44 | 25.26 | 5.00 | 2.00 | 0.00 | 4.81 | 13.08 |
| 7 | Cationic % | 2.96 | 3.44 | 25.26 | 5.00 | 1.10 | 0.00 | 4.81 | 14.08 |
| 8 | Cationic % | 3.96 | 3.44 | 24.26 | 3.00 | 1.10 | 0.00 | 4.81 | 16.08 |
| 9 | Cationic % | 1.96 | 3.44 | 25.26 | 6.00 | 1.10 | 0.00 | 4.81 | 14.08 |
| 10 | Cationic % | 0.96 | 3.44 | 25.26 | 6.00 | 2.10 | 0.00 | 4.81 | 14.08 |
| 11 | Cationic % | 0.00 | 3.44 | 25.26 | 6.00 | 2.10 | 0.00 | 4.81 | 14.08 |
| 12 | Cationic % | 2.06 | 3.44 | 25.26 | 6.00 | 2.00 | 0.00 | 4.81 | 13.08 |
| 13 | Cationic % | 1.06 | 3.44 | 25.26 | 6.00 | 2.00 | 0.00 | 4.81 | 13.08 |
| 14 | Cationic % | 0.00 | 3.44 | 25.26 | 6.00 | 2.00 | 0.00 | 4.81 | 13.08 |
| 15 | Cationic % | 0.00 | 4.50 | 25.26 | 6.00 | 2.00 | 0.00 | 4.81 | 13.08 |

TABLE 1-2-continued

| No. | | Ba²⁺ | Zn²⁺ | La³⁺ | Gd³⁺ | Y³⁺ | Yb³⁺ | Zr⁴⁺ | Ti⁴⁺ |
|---|---|---|---|---|---|---|---|---|---|
| 16 | Cationic % | 0.00 | 4.50 | 26.26 | 6.00 | 2.00 | 0.00 | 4.81 | 13.08 |
| 17 | Cationic % | 0.00 | 4.50 | 25.26 | 6.00 | 3.00 | 0.00 | 4.81 | 13.08 |
| 18 | Cationic % | 0.00 | 3.44 | 27.36 | 6.00 | 0.00 | 0.00 | 4.81 | 14.08 |
| 19 | Cationic % | 0.00 | 3.44 | 25.26 | 6.00 | 3.06 | 0.00 | 4.81 | 14.08 |
| 20 | Cationic % | 0.96 | 4.44 | 25.26 | 6.00 | 2.10 | 0.00 | 4.81 | 13.08 |
| 21 | Cationic % | 0.00 | 4.44 | 25.26 | 6.00 | 3.06 | 0.00 | 4.81 | 13.08 |
| 22 | Cationic % | 0.00 | 3.44 | 25.26 | 6.00 | 2.10 | 0.00 | 4.81 | 15.08 |
| 23 | Cationic % | 0.00 | 3.44 | 25.26 | 6.00 | 2.10 | 0.00 | 4.81 | 16.08 |
| 24 | Cationic % | 0.00 | 2.44 | 25.26 | 6.00 | 2.10 | 0.00 | 4.81 | 17.08 |
| 25 | Cationic % | 0.00 | 2.44 | 27.36 | 6.00 | 1.00 | 0.00 | 4.81 | 17.08 |
| 26 | Cationic % | 0.00 | 2.00 | 28.80 | 6.00 | 1.00 | 0.00 | 4.81 | 17.08 |
| 27 | Cationic % | 0.00 | 2.00 | 28.30 | 6.00 | 1.00 | 0.00 | 5.31 | 17.08 |
| 28 | Cationic % | 0.00 | 2.00 | 30.80 | 4.00 | 0.25 | 0.00 | 4.81 | 17.83 |
| 29 | Cationic % | 0.00 | 2.00 | 34.80 | 0.00 | 0.25 | 0.00 | 4.81 | 17.83 |
| 30 | Cationic % | 0.00 | 2.00 | 30.80 | 4.00 | 0.25 | 0.00 | 4.81 | 18.33 |
| 31 | Cationic % | 0.00 | 1.50 | 30.80 | 4.50 | 0.75 | 0.00 | 4.81 | 17.33 |
| 32 | Cationic % | 0.00 | 2.00 | 30.80 | 4.00 | 0.25 | 0.00 | 4.81 | 14.83 |
| 33 | Cationic % | 0.00 | 1.75 | 30.80 | 4.25 | 0.50 | 0.00 | 4.81 | 16.98 |
| 34 | Cationic % | 0.00 | 1.75 | 28.54 | 4.24 | 0.50 | 0.00 | 4.80 | 18.15 |
| 35 | Cationic % | 0.00 | 1.75 | 29.63 | 3.15 | 0.50 | 0.00 | 4.80 | 18.15 |
| 36 | Cationic % | 0.00 | 1.75 | 29.63 | 3.15 | 0.50 | 0.00 | 4.80 | 17.15 |

TABLE 1-3

| No. | | Mb⁵⁺ | Ta⁵⁺ | W⁶⁺ | Ge⁴⁺ | Bi³⁺ | Al³⁺ | Total |
|---|---|---|---|---|---|---|---|---|
| 1 | Cationic % | 4.07 | 2.00 | 0.00 | 0.00 | 0.00 | 0.00 | 100.00 |
| 2 | Cationic % | 5.07 | 0.00 | 0.00 | 0.00 | 0.00 | 0.00 | 100.00 |
| 3 | Cationic % | 5.07 | 0.00 | 0.00 | 0.00 | 0.00 | 0.00 | 100.00 |
| 4 | Cationic % | 5.07 | 0.00 | 0.00 | 0.00 | 0.00 | 0.00 | 100.00 |
| 5 | Cationic % | 5.07 | 0.00 | 0.00 | 0.00 | 0.00 | 0.00 | 100.00 |
| 6 | Cationic % | 5.07 | 0.00 | 0.00 | 0.00 | 0.00 | 0.00 | 100.00 |
| 7 | Cationic % | 5.07 | 0.00 | 0.00 | 0.00 | 0.00 | 0.00 | 100.00 |
| 8 | Cationic % | 5.07 | 0.00 | 0.00 | 0.00 | 0.00 | 0.00 | 100.00 |
| 9 | Cationic % | 5.07 | 0.00 | 0.00 | 0.00 | 0.00 | 0.00 | 100.00 |
| 10 | Cationic % | 5.07 | 0.00 | 0.00 | 0.00 | 0.00 | 0.00 | 100.00 |
| 11 | Cationic % | 5.07 | 0.00 | 0.00 | 0.00 | 0.00 | 0.00 | 100.00 |
| 12 | Cationic % | 5.07 | 0.00 | 0.00 | 0.00 | 0.00 | 0.00 | 100.00 |
| 13 | Cationic % | 5.07 | 1.00 | 0.00 | 0.00 | 0.00 | 0.00 | 100.00 |
| 14 | Cationic % | 5.07 | 2.06 | 0.00 | 0.00 | 0.00 | 0.00 | 100.00 |
| 15 | Cationic % | 5.07 | 1.00 | 0.00 | 0.00 | 0.00 | 0.00 | 100.00 |
| 16 | Cationic % | 5.07 | 0.00 | 0.00 | 0.00 | 0.00 | 0.00 | 100.00 |
| 17 | Cationic % | 5.07 | 0.00 | 0.00 | 0.00 | 0.00 | 0.00 | 100.00 |
| 18 | Cationic % | 5.07 | 0.00 | 0.00 | 0.00 | 0.00 | 0.00 | 100.00 |
| 19 | Cationic % | 5.07 | 0.00 | 0.00 | 0.00 | 0.00 | 0.00 | 100.00 |
| 20 | Cationic % | 5.07 | 0.00 | 0.00 | 0.00 | 0.00 | 0.00 | 100.00 |
| 21 | Cationic % | 5.07 | 0.00 | 0.00 | 0.00 | 0.00 | 0.00 | 100.00 |
| 22 | Cationic % | 5.07 | 0.00 | 0.00 | 0.00 | 0.00 | 0.00 | 100.00 |
| 23 | Cationic % | 5.07 | 0.00 | 0.00 | 0.00 | 0.00 | 0.00 | 100.00 |
| 24 | Cationic % | 5.07 | 0.00 | 0.00 | 0.00 | 0.00 | 0.00 | 100.00 |
| 25 | Cationic % | 6.07 | 0.00 | 0.00 | 0.00 | 0.00 | 0.00 | 100.00 |
| 26 | Cationic % | 6.07 | 0.00 | 0.00 | 0.00 | 0.00 | 0.00 | 100.00 |
| 27 | Cationic % | 6.07 | 0.00 | 0.00 | 0.00 | 0.00 | 0.00 | 100.00 |
| 28 | Cationic % | 6.07 | 0.00 | 0.00 | 0.00 | 0.00 | 0.00 | 100.00 |
| 29 | Cationic % | 6.07 | 0.00 | 0.00 | 0.00 | 0.00 | 0.00 | 100.00 |
| 30 | Cationic % | 6.07 | 0.00 | 0.00 | 0.00 | 0.00 | 0.00 | 100.00 |
| 31 | Cationic % | 6.07 | 0.00 | 0.00 | 0.00 | 0.00 | 0.00 | 100.00 |
| 32 | Cationic % | 6.07 | 0.00 | 0.00 | 0.00 | 0.00 | 0.00 | 100.00 |
| 33 | Cationic % | 6.07 | 0.00 | 0.00 | 0.00 | 0.00 | 0.00 | 100.00 |
| 34 | Cationic % | 6.06 | 0.00 | 0.00 | 0.00 | 0.00 | 0.00 | 100.00 |
| 35 | Cationic % | 6.06 | 0.00 | 0.00 | 0.00 | 0.00 | 0.00 | 100.00 |
| 36 | Cationic % | 7.06 | 0.00 | 0.00 | 0.00 | 0.00 | 0.00 | 100.00 |

TABLE 1-4

| No. | | $Si^{4+}/B^{3+}$ | $Li^+ + Na^+ + K^+$ | $Mg^{2+} + Ca^{2+} + Sr^{2+}$ | nd | νd | $P_{g,F}$ | Specific gravity |
|---|---|---|---|---|---|---|---|---|
| 1 | Cationic % | 0.3770 | 0.00 | 0.00 | 1.95085 | 30.21 | 0.59771 | 4.97 |
| 2 | Cationic % | 0.3770 | 0.00 | 0.00 | 1.94938 | 30.32 | 0.59534 | 4.91 |
| 3 | Cationic % | 0.3770 | 0.00 | 0.00 | 1.95378 | 30.34 | 0.59669 | 4.92 |
| 4 | Cationic % | 0.3770 | 0.00 | 0.00 | 1.94958 | 30.96 | 0.59700 | 4.97 |
| 5 | Cationic % | 0.3770 | 0.00 | 0.00 | 1.94542 | 31.50 | 0.59214 | 5.02 |
| 6 | Cationic % | 0.3770 | 0.00 | 0.00 | 1.94831 | 31.56 | 0.59468 | 5.02 |
| 7 | Cationic % | 0.3770 | 0.00 | 0.00 | 1.95348 | 30.94 | 0.59734 | 5.00 |
| 8 | Cationic % | 0.3770 | 0.00 | 0.00 | 1.9574 | 29.79 | 0.59863 | 4.89 |
| 9 | Cationic % | 0.3770 | 0.00 | 0.00 | 1.95744 | 30.89 | 0.59516 | 5.03 |
| 10 | Cationic % | 0.3770 | 0.00 | 0.00 | 1.96065 | 30.87 | 0.59512 | 5.03 |
| 11 | Cationic % | 0.3644 | 0.00 | 0.00 | 1.961 | 30.80 | 0.59551 | 5.01 |
| 12 | Cationic % | 0.3770 | 0.00 | 0.00 | 1.9525 | 31.44 | 0.59208 | 5.05 |
| 13 | Cationic % | 0.3770 | 0.00 | 0.00 | 1.95901 | 31.17 | 0.59376 | 5.09 |
| 14 | Cationic % | 0.3770 | 0.00 | 0.00 | 1.9656 | 30.82 | 0.59464 | 5.13 |
| 15 | Cationic % | 0.3770 | 0.00 | 0.00 | 1.9618 | 31.01 | 0.5909091 | 5.09 |
| 16 | Cationic % | 0.3770 | 0.00 | 0.00 | 1.95955 | 31.37 | 0.5943119 | 5.07 |
| 17 | Cationic % | 0.3770 | 0.00 | 0.00 | 1.95862 | 31.36 | 0.5947007 | 5.05 |
| 18 | Cationic % | 0.3644 | 0.00 | 0.00 | 1.96311 | 30.8 | 0.5951391 | 5.04 |
| 19 | Cationic % | 0.3770 | 0.00 | 0.00 | 1.96422 | 30.83 | 0.59463 | 5.03 |
| 20 | Cationic % | 0.3770 | 0.00 | 0.00 | 1.95560 | 31.37 | 0.59324 | 5.04 |
| 21 | Cationic % | 0.3770 | 0.00 | 0.00 | 1.95877 | 31.33 | 0.59248 | 5.05 |
| 22 | Cationic % | 0.3775 | 0.00 | 0.00 | 1.96893 | 30.28 | 0.59906 | 5.02 |

TABLE 1-4-continued

| No. | | Si⁴⁺/B³⁺ | Li⁺ + Na⁺ + K⁺ | Mg²⁺ + Ca²⁺ + Sr²⁺ | nd | νd | $P_{g,F}$ | Specific gravity |
|---|---|---|---|---|---|---|---|---|
| 23 | Cationic % | 0.3916 | 0.00 | 0.00 | 1.97672 | 29.74 | 0.59866 | 5.02 |
| 24 | Cationic % | 0.3916 | 0.00 | 0.00 | 1.98151 | 29.29 | 0.60042 | 5.01 |
| 25 | Cationic % | 0.4233 | 0.00 | 0.00 | 1.9939 | 29 | 0.60082 | 5.09 |
| 26 | Cationic % | 0.4411 | 0.00 | 0.00 | 1.99794 | 29.11 | 0.60035 | 5.13 |
| 27 | Cationic % | 0.4411 | 0.00 | 0.00 | 1.99882 | 29.11 | 0.60187 | 5.12 |
| 28 | Cationic % | 0.4411 | 0.00 | 0.00 | 2.00209 | 28.68 | 0.60132 | 5.09 |
| 29 | Cationic % | 0.4411 | 0.00 | 0.00 | 2.00224 | 28.72 | 0.60029 | 5.03 |
| 30 | Cationic % | 0.4506 | 0.00 | 0.00 | 2.00582 | 28.45 | 0.60238 | 5.08 |
| 31 | Cationic % | 0.4411 | 0.00 | 0.00 | 2.00041 | 29.01 | 0.5989 | 5.12 |
| 32 | Cationic % | 0.3916 | 0.00 | 0.00 | 1.97948 | 30.16 | 0.59575 | 5.07 |
| 33 | Cationic % | 0.2971 | 0.00 | 0.00 | 2.00165 | 29.05 | 0.59948 | 5.12 |
| 34 | Cationic % | 0.0613 | 0.00 | 0.00 | 2.00392 | 28.25 | 0.60214 | 5.04 |
| 35 | Cationic % | 0.0591 | 0.00 | 0.00 | 2.00401 | 28.28 | 0.60394 | 5.02 |
| 36 | Cationic % | 0.0591 | 0.00 | 0.00 | 2.00341 | 28.4 | 0.60289 | 5.03 |

TABLE 1-5

| No. | | Tg (°C.) | Ts (°C.) | Liquidus temperature (°C.) | λ 70(nm) | λ 5(nm) |
|---|---|---|---|---|---|---|
| 1 | Cationic % | 688 | 741 | 1180 less than | 436 | 363 |
| 2 | Cationic % | 686 | 738 | 1180 less than | 434 | 362 |
| 3 | Cationic % | 690 | 743 | 1190 less than | 443 | 363 |
| 4 | Cationic % | 694 | 744 | 1190 less than | 455 | 363 |
| 5 | Cationic % | 695 | 747 | 1200 less than | 431 | 359 |
| 6 | Cationic % | 698 | 751 | 1180 less than | 432 | 360 |
| 7 | Cationic % | 694 | 742 | 1180 less than | 438 | 361 |
| 8 | Cationic % | 687 | 738 | 1180 less than | 448 | 365 |
| 9 | Cationic % | 697 | 750 | 1180 less than | 433 | 361 |
| 10 | Cationic % | 700 | 751 | 1180 less than | 434 | 362 |
| 11 | Cationic % | 697 | 750 | 1180 less than | 437 | 363 |
| 12 | Cationic % | 700 | 753 | 1200 less than | 427 | 359 |
| 13 | Cationic % | 700 | 753 | 1190 less than | 431 | 361 |
| 14 | Cationic % | 699 | 753 | 1220 less than | 435 | 362 |
| 15 | Cationic % | 694 | 749 | 1190 less than | 434 | 362 |
| 16 | Cationic % | 698 | 751 | 1200 less than | 431 | 360 |
| 17 | Cationic % | 699 | 750 | 1190 less than | 431 | 360 |
| 18 | Cationic % | 697 | 748 | 1200 less than | 433 | 362 |
| 19 | Cationic % | 702 | 753 | 1190 less than | 436 | 362 |
| 20 | Cationic % | 694 | 746 | 1190 less than | 430 | 360 |
| 21 | Cationic % | 698 | 752 | 1200 less than | 431 | 360 |
| 22 | Cationic % | 699 | 751 | 1180 less than | 444 | 365 |
| 23 | Cationic % | 702 | 752 | 1180 less than | 451 | 366 |
| 24 | Cationic % | 707 | 757 | 1180 less than | 457 | 367 |
| 25 | Cationic % | 713 | 761 | 1180 less than | 450 | 367 |
| 26 | Cationic % | 722 | 772 | 1190 less than | 450 | 366 |
| 27 | Cationic % | 713 | 771 | 1220 less than | 449 | 366 |
| 28 | Cationic % | 716 | 766 | 1190 less than | 466 | 370 |
| 29 | Cationic % | 713 | 764 | 1210 less than | 464 | 369 |
| 30 | Cationic % | 714 | 766 | 1200 less than | 469 | 371 |
| 31 | Cationic % | 721 | 772 | 1190 less than | 460 | 368 |
| 32 | Cationic % | 713 | 763 | 1190 less than | 450 | 365 |
| 33 | Cationic % | 714 | 764 | 1190 less than | 462 | 368 |
| 34 | Cationic % | 707 | 757 | 1180 less than | 468 | 370 |
| 35 | Cationic % | 707 | 758 | 1180 less than | 468 | 370 |
| 36 | Cationic % | 706 | 756 | 1190 less than | 466 | 369 |

TABLE 2-1

| No. | | SiO₂ | B₂O₃ | Li₂O | Na₂O | K₂O | MgO | CaO | SrO |
|---|---|---|---|---|---|---|---|---|---|
| 1 | Mass % | 6.38 | 9.80 | 0.00 | 0.00 | 0.00 | 0.00 | 0.00 | 0.00 |
| 2 | Mass % | 6.47 | 9.95 | 0.00 | 0.00 | 0.00 | 0.00 | 0.00 | 0.00 |
| 3 | Mass % | 6.47 | 9.94 | 0.00 | 0.00 | 0.00 | 0.00 | 0.00 | 0.00 |
| 4 | Mass % | 6.40 | 9.83 | 0.00 | 0.00 | 0.00 | 0.00 | 0.00 | 0.00 |
| 5 | Mass % | 6.33 | 9.73 | 0.00 | 0.00 | 0.00 | 0.00 | 0.00 | 0.00 |
| 6 | Mass % | 6.36 | 9.77 | 0.00 | 0.00 | 0.00 | 0.00 | 0.00 | 0.00 |
| 7 | Mass % | 6.38 | 9.81 | 0.00 | 0.00 | 0.00 | 0.00 | 0.00 | 0.00 |
| 8 | Mass % | 6.52 | 10.02 | 0.00 | 0.00 | 0.00 | 0.00 | 0.00 | 0.00 |
| 9 | Mass % | 6.36 | 9.78 | 0.00 | 0.00 | 0.00 | 0.00 | 0.00 | 0.00 |
| 10 | Mass % | 6.39 | 9.82 | 0.00 | 0.00 | 0.00 | 0.00 | 0.00 | 0.00 |
| 11 | Mass % | 6.46 | 10.28 | 0.00 | 0.00 | 0.00 | 0.00 | 0.00 | 0.00 |
| 12 | Mass % | 6.34 | 9.74 | 0.00 | 0.00 | 0.00 | 0.00 | 0.00 | 0.00 |
| 13 | Mass % | 6.30 | 9.68 | 0.00 | 0.00 | 0.00 | 0.00 | 0.00 | 0.00 |
| 14 | Mass % | 6.25 | 9.61 | 0.00 | 0.00 | 0.00 | 0.00 | 0.00 | 0.00 |
| 15 | Mass % | 6.34 | 9.75 | 0.00 | 0.00 | 0.00 | 0.00 | 0.00 | 0.00 |
| 16 | Mass % | 6.38 | 9.81 | 0.00 | 0.00 | 0.00 | 0.00 | 0.00 | 0.00 |
| 17 | Mass % | 6.41 | 9.86 | 0.00 | 0.00 | 0.00 | 0.00 | 0.00 | 0.00 |
| 18 | Mass % | 6.39 | 10.17 | 0.00 | 0.00 | 0.00 | 0.00 | 0.00 | 0.00 |
| 19 | Mass % | 6.41 | 9.86 | 0.00 | 0.00 | 0.00 | 0.00 | 0.00 | 0.00 |
| 20 | Mass % | 6.39 | 9.82 | 0.00 | 0.00 | 0.00 | 0.00 | 0.00 | 0.00 |
| 21 | Mass % | 6.41 | 9.86 | 0.00 | 0.00 | 0.00 | 0.00 | 0.00 | 0.00 |
| 22 | Mass % | 6.43 | 9.87 | 0.00 | 0.00 | 0.00 | 0.00 | 0.00 | 0.00 |
| 23 | Mass % | 6.40 | 9.47 | 0.00 | 0.00 | 0.00 | 0.00 | 0.00 | 0.00 |
| 24 | Mass % | 6.41 | 9.48 | 0.00 | 0.00 | 0.00 | 0.00 | 0.00 | 0.00 |
| 25 | Mass % | 6.23 | 8.52 | 0.00 | 0.00 | 0.00 | 0.00 | 0.00 | 0.00 |
| 26 | Mass % | 6.13 | 8.05 | 0.00 | 0.00 | 0.00 | 0.00 | 0.00 | 0.00 |
| 27 | Mass % | 6.14 | 8.06 | 0.00 | 0.00 | 0.00 | 0.00 | 0.00 | 0.00 |
| 28 | Mass % | 6.16 | 8.10 | 0.00 | 0.00 | 0.00 | 0.00 | 0.00 | 0.00 |
| 29 | Mass % | 6.21 | 8.16 | 0.00 | 0.00 | 0.00 | 0.00 | 0.00 | 0.00 |
| 30 | Mass % | 6.15 | 7.91 | 0.00 | 0.00 | 0.00 | 0.00 | 0.00 | 0.00 |
| 31 | Mass % | 6.12 | 8.05 | 0.00 | 0.00 | 0.00 | 0.00 | 0.00 | 0.00 |
| 32 | Mass % | 6.25 | 9.24 | 0.00 | 0.00 | 0.00 | 0.00 | 0.00 | 0.00 |
| 33 | Mass % | 4.72 | 9.21 | 0.00 | 0.00 | 0.00 | 0.00 | 0.00 | 0.00 |
| 34 | Mass % | 4.82 | 9.83 | 0.00 | 0.00 | 0.00 | 0.00 | 0.00 | 0.00 |
| 35 | Mass % | 4.83 | 9.85 | 0.00 | 0.00 | 0.00 | 0.00 | 0.00 | 0.00 |
| 36 | Mass % | 4.81 | 9.80 | 0.00 | 0.00 | 0.00 | 0.00 | 0.00 | 0.00 |

TABLE 2-2

| No. | | BaO | ZnO | La₂O₃ | Gd₂O₃ | Y₂O₃ | Yb₂O₃ | ZrO₂ | TiO₂ |
|---|---|---|---|---|---|---|---|---|---|
| 1 | Mass % | 7.70 | 2.84 | 38.37 | 5.51 | 1.26 | 0.00 | 6.00 | 12.20 |
| 2 | Mass % | 7.82 | 2.88 | 40.62 | 5.59 | 1.28 | 0.00 | 6.09 | 12.38 |
| 3 | Mass % | 6.23 | 2.87 | 42.25 | 5.58 | 1.28 | 0.00 | 6.09 | 12.37 |
| 4 | Mass % | 6.17 | 2.85 | 41.82 | 7.37 | 1.26 | 0.00 | 6.02 | 11.43 |
| 5 | Mass % | 6.11 | 2.82 | 41.39 | 9.12 | 1.25 | 0.00 | 5.96 | 10.51 |
| 6 | Mass % | 4.74 | 2.83 | 41.54 | 9.15 | 2.28 | 0.00 | 5.98 | 10.55 |
| 7 | Mass % | 4.60 | 2.84 | 41.70 | 9.18 | 1.26 | 0.00 | 6.01 | 11.40 |
| 8 | Mass % | 6.29 | 2.90 | 40.93 | 5.63 | 1.29 | 0.00 | 6.14 | 13.30 |
| 9 | Mass % | 3.04 | 2.83 | 41.58 | 10.99 | 1.26 | 0.00 | 5.99 | 11.37 |

TABLE 2-2-continued

| No. | | BaO | ZnO | La$_2$O$_3$ | Gd$_2$O$_3$ | Y$_2$O$_3$ | Yb$_2$O$_3$ | ZrO$_2$ | TiO$_2$ |
|---|---|---|---|---|---|---|---|---|---|
| 10 | Mass % | 1.49 | 2.84 | 41.75 | 11.03 | 2.41 | 0.00 | 6.01 | 11.41 |
| 11 | Mass % | 0.00 | 2.87 | 42.24 | 11.16 | 2.43 | 0.00 | 6.08 | 11.55 |
| 12 | Mass % | 3.18 | 2.82 | 41.43 | 10.95 | 2.27 | 0.00 | 5.97 | 10.52 |
| 13 | Mass % | 1.63 | 2.80 | 41.15 | 10.87 | 2.26 | 0.00 | 5.93 | 10.45 |
| 14 | Mass % | 0.00 | 2.78 | 40.86 | 10.80 | 2.24 | 0.00 | 5.88 | 10.37 |
| 15 | Mass % | 0.00 | 3.69 | 41.46 | 10.96 | 2.28 | 0.00 | 5.97 | 10.53 |
| 16 | Mass % | 0.00 | 3.71 | 43.36 | 11.02 | 2.29 | 0.00 | 6.01 | 10.59 |
| 17 | Mass % | 0.00 | 3.73 | 41.92 | 11.08 | 3.45 | 0.00 | 6.04 | 10.64 |
| 18 | Mass % | 0.00 | 2.84 | 45.28 | 11.04 | 0.00 | 0.00 | 6.02 | 11.42 |
| 19 | Mass % | 0.00 | 2.85 | 41.92 | 11.08 | 3.52 | 0.00 | 6.04 | 11.46 |
| 20 | Mass % | 1.49 | 3.67 | 41.75 | 11.03 | 2.41 | 0.00 | 6.01 | 10.60 |
| 21 | Mass % | 0.00 | 3.68 | 41.91 | 11.08 | 3.52 | 0.00 | 6.04 | 10.64 |
| 22 | Mass % | 0.00 | 2.86 | 42.05 | 11.11 | 2.42 | 0.00 | 6.06 | 12.31 |
| 23 | Mass % | 0.00 | 2.85 | 41.86 | 11.06 | 2.41 | 0.00 | 6.03 | 13.07 |
| 24 | Mass % | 0.00 | 2.02 | 41.86 | 11.06 | 2.41 | 0.00 | 6.03 | 13.88 |
| 25 | Mass % | 0.00 | 1.96 | 44.08 | 10.76 | 1.12 | 0.00 | 5.86 | 13.49 |
| 26 | Mass % | 0.00 | 1.58 | 45.66 | 10.58 | 1.10 | 0.00 | 5.77 | 13.28 |
| 27 | Mass % | 0.00 | 1.59 | 44.96 | 10.60 | 1.10 | 0.00 | 6.38 | 13.30 |
| 28 | Mass % | 0.00 | 1.59 | 49.13 | 7.10 | 0.28 | 0.00 | 5.80 | 13.94 |
| 29 | Mass % | 0.00 | 1.61 | 55.90 | 0.00 | 0.28 | 0.00 | 5.84 | 14.04 |
| 30 | Mass % | 0.00 | 1.59 | 49.02 | 7.08 | 0.28 | 0.00 | 5.79 | 14.30 |
| 31 | Mass % | 0.00 | 1.19 | 48.80 | 7.93 | 0.82 | 0.00 | 5.77 | 13.47 |
| 32 | Mass % | 0.00 | 1.62 | 49.79 | 7.19 | 0.28 | 0.00 | 5.88 | 11.75 |
| 33 | Mass % | 0.00 | 1.40 | 49.40 | 7.58 | 0.56 | 0.00 | 5.84 | 13.35 |
| 34 | Mass % | 0.00 | 1.43 | 46.90 | 7.75 | 0.57 | 0.00 | 5.96 | 14.62 |
| 35 | Mass % | 0.00 | 1.44 | 48.79 | 5.77 | 0.57 | 0.00 | 5.97 | 14.65 |
| 36 | Mass % | 0.00 | 1.43 | 48.52 | 5.74 | 0.57 | 0.00 | 5.94 | 13.77 |

TABLE 2-3

| No. | | Nb$_2$O$_5$ | Ta$_2$O$_5$ | WO$_3$ | GeO$_2$ | Bi$_2$O$_3$ | Al$_2$O$_3$ | Total | Nb$_2$O$_5$ + Ta$_2$O$_5$ |
|---|---|---|---|---|---|---|---|---|---|
| 1 | Mass % | 5.48 | 4.47 | 0.00 | 0.00 | 0.00 | 0.00 | 100.00 | 9.95 |
| 2 | Mass % | 6.93 | 0.00 | 0.00 | 0.00 | 0.00 | 0.00 | 100.00 | 6.93 |
| 3 | Mass % | 6.92 | 0.00 | 0.00 | 0.00 | 0.00 | 0.00 | 100.00 | 6.92 |
| 4 | Mass % | 6.85 | 0.00 | 0.00 | 0.00 | 0.00 | 0.00 | 100.00 | 6.85 |
| 5 | Mass % | 6.78 | 0.00 | 0.00 | 0.00 | 0.00 | 0.00 | 100.00 | 6.78 |
| 6 | Mass % | 6.80 | 0.00 | 0.00 | 0.00 | 0.00 | 0.00 | 100.00 | 6.80 |
| 7 | Mass % | 6.83 | 0.00 | 0.00 | 0.00 | 0.00 | 0.00 | 100.00 | 6.83 |
| 8 | Mass % | 6.98 | 0.00 | 0.00 | 0.00 | 0.00 | 0.00 | 100.00 | 6.98 |
| 9 | Mass % | 6.81 | 0.00 | 0.00 | 0.00 | 0.00 | 0.00 | 100.00 | 6.81 |
| 10 | Mass % | 6.84 | 0.00 | 0.00 | 0.00 | 0.00 | 0.00 | 100.00 | 6.84 |
| 11 | Mass % | 6.92 | 0.00 | 0.00 | 0.00 | 0.00 | 0.00 | 100.00 | 6.92 |
| 12 | Mass % | 6.78 | 0.00 | 0.00 | 0.00 | 0.00 | 0.00 | 100.00 | 6.78 |
| 13 | Mass % | 6.74 | 2.21 | 0.00 | 0.00 | 0.00 | 0.00 | 100.00 | 8.95 |
| 14 | Mass % | 6.69 | 4.52 | 0.00 | 0.00 | 0.00 | 0.00 | 100.00 | 11.21 |
| 15 | Mass % | 6.79 | 2.23 | 0.00 | 0.00 | 0.00 | 0.00 | 100.00 | 9.02 |
| 16 | Mass % | 6.83 | 0.00 | 0.00 | 0.00 | 0.00 | 0.00 | 100.00 | 6.83 |
| 17 | Mass % | 6.86 | 0.00 | 0.00 | 0.00 | 0.00 | 0.00 | 100.00 | 6.86 |
| 18 | Mass % | 6.84 | 0.00 | 0.00 | 0.00 | 0.00 | 0.00 | 100.00 | 6.84 |
| 19 | Mass % | 6.86 | 0.00 | 0.00 | 0.00 | 0.00 | 0.00 | 100.00 | 6.86 |
| 20 | Mass % | 6.84 | 0.00 | 0.00 | 0.00 | 0.00 | 0.00 | 100.00 | 6.84 |
| 21 | Mass % | 6.86 | 0.00 | 0.00 | 0.00 | 0.00 | 0.00 | 100.00 | 6.86 |
| 22 | Mass % | 6.89 | 0.00 | 0.00 | 0.00 | 0.00 | 0.00 | 100.00 | 6.89 |
| 23 | Mass % | 6.85 | 0.00 | 0.00 | 0.00 | 0.00 | 0.00 | 100.00 | 6.85 |
| 24 | Mass % | 6.85 | 0.00 | 0.00 | 0.00 | 0.00 | 0.00 | 100.00 | 6.85 |
| 25 | Mass % | 7.98 | 0.00 | 0.00 | 0.00 | 0.00 | 0.00 | 100.00 | 7.98 |
| 26 | Mass % | 7.85 | 0.00 | 0.00 | 0.00 | 0.00 | 0.00 | 100.00 | 7.85 |
| 27 | Mass % | 7.87 | 0.00 | 0.00 | 0.00 | 0.00 | 0.00 | 100.00 | 7.87 |
| 28 | Mass % | 7.90 | 0.00 | 0.00 | 0.00 | 0.00 | 0.00 | 100.00 | 7.90 |
| 29 | Mass % | 7.96 | 0.00 | 0.00 | 0.00 | 0.00 | 0.00 | 100.00 | 7.96 |
| 30 | Mass % | 7.88 | 0.00 | 0.00 | 0.00 | 0.00 | 0.00 | 100.00 | 7.88 |
| 31 | Mass % | 7.85 | 0.00 | 0.00 | 0.00 | 0.00 | 0.00 | 100.00 | 7.85 |
| 32 | Mass % | 8.00 | 0.00 | 0.00 | 0.00 | 0.00 | 0.00 | 100.00 | 8.00 |
| 33 | Mass % | 7.94 | 0.00 | 0.00 | 0.00 | 0.00 | 0.00 | 100.00 | 7.94 |
| 34 | Mass % | 8.12 | 0.00 | 0.00 | 0.00 | 0.00 | 0.00 | 100.00 | 8.12 |
| 35 | Mass % | 8.13 | 0.00 | 0.00 | 0.00 | 0.00 | 0.00 | 100.00 | 8.13 |
| 36 | Mass % | 9.42 | 0.00 | 0.00 | 0.00 | 0.00 | 0.00 | 100.00 | 9.42 |

TABLE 3-1

| No. | | SiO$_2$ | B$_2$O$_3$ | Li$_2$O | Na$_2$O | K$_2$O | MgO | CaO | SrO |
|---|---|---|---|---|---|---|---|---|---|
| 1 | mol % | 15.10 | 20.03 | 0.00 | 0.00 | 0.00 | 0.00 | 0.00 | 0.00 |
| 2 | mol % | 15.10 | 20.03 | 0.00 | 0.00 | 0.00 | 0.00 | 0.00 | 0.00 |
| 3 | mol % | 15.21 | 20.18 | 0.00 | 0.00 | 0.00 | 0.00 | 0.00 | 0.00 |
| 4 | mol % | 15.32 | 20.33 | 0.00 | 0.00 | 0.00 | 0.00 | 0.00 | 0.00 |
| 5 | mol % | 15.44 | 20.48 | 0.00 | 0.00 | 0.00 | 0.00 | 0.00 | 0.00 |
| 6 | mol % | 15.54 | 20.61 | 0.00 | 0.00 | 0.00 | 0.00 | 0.00 | 0.00 |
| 7 | mol % | 15.44 | 20.48 | 0.00 | 0.00 | 0.00 | 0.00 | 0.00 | 0.00 |
| 8 | mol % | 15.10 | 20.03 | 0.00 | 0.00 | 0.00 | 0.00 | 0.00 | 0.00 |
| 9 | mol % | 15.55 | 20.63 | 0.00 | 0.00 | 0.00 | 0.00 | 0.00 | 0.00 |
| 10 | mol % | 15.67 | 20.78 | 0.00 | 0.00 | 0.00 | 0.00 | 0.00 | 0.00 |
| 11 | mol % | 15.78 | 21.65 | 0.00 | 0.00 | 0.00 | 0.00 | 0.00 | 0.00 |
| 12 | mol % | 15.66 | 20.77 | 0.00 | 0.00 | 0.00 | 0.00 | 0.00 | 0.00 |
| 13 | mol % | 15.77 | 20.92 | 0.00 | 0.00 | 0.00 | 0.00 | 0.00 | 0.00 |
| 14 | mol % | 15.90 | 21.09 | 0.00 | 0.00 | 0.00 | 0.00 | 0.00 | 0.00 |
| 15 | mol % | 15.77 | 20.92 | 0.00 | 0.00 | 0.00 | 0.00 | 0.00 | 0.00 |
| 16 | mol % | 15.77 | 20.92 | 0.00 | 0.00 | 0.00 | 0.00 | 0.00 | 0.00 |
| 17 | mol % | 15.77 | 20.92 | 0.00 | 0.00 | 0.00 | 0.00 | 0.00 | 0.00 |
| 18 | mol % | 15.78 | 21.65 | 0.00 | 0.00 | 0.00 | 0.00 | 0.00 | 0.00 |
| 19 | mol % | 15.78 | 20.93 | 0.00 | 0.00 | 0.00 | 0.00 | 0.00 | 0.00 |
| 20 | mol % | 15.67 | 20.78 | 0.00 | 0.00 | 0.00 | 0.00 | 0.00 | 0.00 |
| 21 | mol % | 15.78 | 20.93 | 0.00 | 0.00 | 0.00 | 0.00 | 0.00 | 0.00 |
| 22 | mol % | 15.66 | 20.75 | 0.00 | 0.00 | 0.00 | 0.00 | 0.00 | 0.00 |
| 23 | mol % | 15.55 | 19.85 | 0.00 | 0.00 | 0.00 | 0.00 | 0.00 | 0.00 |
| 24 | mol % | 15.55 | 19.85 | 0.00 | 0.00 | 0.00 | 0.00 | 0.00 | 0.00 |
| 25 | mol % | 15.55 | 18.37 | 0.00 | 0.00 | 0.00 | 0.00 | 0.00 | 0.00 |
| 26 | mol % | 15.60 | 17.68 | 0.00 | 0.00 | 0.00 | 0.00 | 0.00 | 0.00 |
| 27 | mol % | 15.54 | 17.62 | 0.00 | 0.00 | 0.00 | 0.00 | 0.00 | 0.00 |
| 28 | mol % | 15.51 | 17.58 | 0.00 | 0.00 | 0.00 | 0.00 | 0.00 | 0.00 |
| 29 | mol % | 15.51 | 17.58 | 0.00 | 0.00 | 0.00 | 0.00 | 0.00 | 0.00 |
| 30 | mol % | 15.45 | 17.15 | 0.00 | 0.00 | 0.00 | 0.00 | 0.00 | 0.00 |
| 31 | mol % | 15.63 | 17.72 | 0.00 | 0.00 | 0.00 | 0.00 | 0.00 | 0.00 |
| 32 | mol % | 15.86 | 20.25 | 0.00 | 0.00 | 0.00 | 0.00 | 0.00 | 0.00 |
| 33 | mol % | 12.14 | 20.42 | 0.00 | 0.00 | 0.00 | 0.00 | 0.00 | 0.00 |
| 34 | mol % | 12.00 | 21.12 | 0.00 | 0.00 | 0.00 | 0.00 | 0.00 | 0.00 |
| 35 | mol % | 12.00 | 21.13 | 0.00 | 0.00 | 0.00 | 0.00 | 0.00 | 0.00 |
| 36 | mol % | 12.09 | 21.28 | 0.00 | 0.00 | 0.00 | 0.00 | 0.00 | 0.00 |

TABLE 3-2

| No. | | BaO | ZnO | La$_2$O$_3$ | Gd$_2$O$_3$ | Y$_2$O$_3$ | Yb$_2$O$_3$ | ZrO$_2$ | TiO$_2$ |
|---|---|---|---|---|---|---|---|---|---|
| 1 | mol % | 7.15 | 4.96 | 16.76 | 2.16 | 0.79 | 0.00 | 6.93 | 21.73 |
| 2 | mol % | 7.15 | 4.96 | 17.48 | 2.16 | 0.79 | 0.00 | 6.93 | 21.73 |
| 3 | mol % | 5.75 | 4.99 | 18.33 | 2.18 | 0.80 | 0.00 | 6.98 | 21.89 |
| 4 | mol % | 5.79 | 5.03 | 18.47 | 2.92 | 0.80 | 0.00 | 7.03 | 20.59 |
| 5 | mol % | 5.83 | 5.07 | 18.60 | 3.68 | 0.81 | 0.00 | 7.09 | 19.27 |
| 6 | mol % | 4.54 | 5.10 | 18.73 | 3.71 | 1.48 | 0.00 | 7.13 | 19.40 |
| 7 | mol % | 4.36 | 5.07 | 18.60 | 3.68 | 0.81 | 0.00 | 7.09 | 20.74 |
| 8 | mol % | 5.71 | 4.96 | 17.48 | 2.16 | 0.79 | 0.00 | 6.93 | 23.18 |
| 9 | mol % | 2.91 | 5.10 | 18.74 | 4.45 | 0.82 | 0.00 | 7.14 | 20.89 |
| 10 | mol % | 1.44 | 5.14 | 18.88 | 4.49 | 1.57 | 0.00 | 7.19 | 21.05 |
| 11 | mol % | 0.00 | 5.18 | 19.02 | 4.52 | 1.58 | 0.00 | 7.24 | 21.20 |
| 12 | mol % | 3.08 | 5.14 | 18.87 | 4.48 | 1.49 | 0.00 | 7.19 | 19.54 |
| 13 | mol % | 1.60 | 5.18 | 19.01 | 4.52 | 1.51 | 0.00 | 7.24 | 19.69 |
| 14 | mol % | 0.00 | 5.22 | 19.16 | 4.55 | 1.52 | 0.00 | 7.30 | 19.85 |
| 15 | mol % | 0.00 | 6.77 | 19.01 | 4.52 | 1.51 | 0.00 | 7.24 | 19.69 |
| 16 | mol % | 0.00 | 6.77 | 19.76 | 4.52 | 1.51 | 0.00 | 7.24 | 19.69 |
| 17 | mol % | 0.00 | 6.77 | 19.01 | 4.52 | 2.26 | 0.00 | 7.24 | 19.69 |
| 18 | mol % | 0.00 | 5.18 | 20.61 | 4.52 | 0.00 | 0.00 | 7.24 | 21.20 |
| 19 | mol % | 0.00 | 5.18 | 19.02 | 4.52 | 2.30 | 0.00 | 7.24 | 21.20 |
| 20 | mol % | 1.44 | 6.64 | 18.88 | 4.49 | 1.57 | 0.00 | 7.19 | 19.56 |
| 21 | mol % | 0.00 | 6.69 | 19.02 | 4.52 | 2.30 | 0.00 | 7.24 | 19.70 |
| 22 | mol % | 0.00 | 5.14 | 18.88 | 4.48 | 1.57 | 0.00 | 7.19 | 22.54 |
| 23 | mol % | 0.00 | 5.10 | 18.73 | 4.45 | 1.56 | 0.00 | 7.14 | 23.86 |
| 24 | mol % | 0.00 | 3.62 | 18.73 | 4.45 | 1.56 | 0.00 | 7.14 | 25.34 |
| 25 | mol % | 0.00 | 3.62 | 20.29 | 4.45 | 0.74 | 0.00 | 7.14 | 25.34 |
| 26 | mol % | 0.00 | 2.98 | 21.43 | 4.47 | 0.74 | 0.00 | 7.16 | 25.42 |
| 27 | mol % | 0.00 | 2.97 | 20.98 | 4.45 | 0.74 | 0.00 | 7.87 | 25.33 |
| 28 | mol % | 0.00 | 2.96 | 22.80 | 2.96 | 0.19 | 0.00 | 7.12 | 26.39 |
| 29 | mol % | 0.00 | 2.96 | 25.76 | 0.00 | 0.19 | 0.00 | 7.12 | 26.39 |
| 30 | mol % | 0.00 | 2.95 | 22.72 | 2.95 | 0.18 | 0.00 | 7.09 | 27.03 |
| 31 | mol % | 0.00 | 2.24 | 22.95 | 3.36 | 0.56 | 0.00 | 7.17 | 25.84 |
| 32 | mol % | 0.00 | 3.03 | 23.32 | 3.03 | 0.19 | 0.00 | 7.28 | 22.45 |
| 33 | mol % | 0.00 | 2.66 | 23.42 | 3.23 | 0.38 | 0.00 | 7.31 | 25.82 |
| 34 | mol % | 0.00 | 2.63 | 21.52 | 3.20 | 0.38 | 0.00 | 7.23 | 27.36 |
| 35 | mol % | 0.00 | 2.63 | 22.34 | 2.37 | 0.38 | 0.00 | 7.23 | 27.36 |
| 36 | mol % | 0.00 | 2.65 | 22.51 | 2.39 | 0.38 | 0.00 | 7.29 | 26.05 |

TABLE 3-3

| No. | | Nb$_2$O$_5$ | Ta$_2$O$_5$ | WO$_3$ | GeO$_2$ | Bi$_2$O$_3$ | Al$_2$O$_3$ | Total |
|---|---|---|---|---|---|---|---|---|
| 1 | mol % | 2.93 | 1.44 | 0.00 | 0.00 | 0.00 | 0.00 | 100.00 |
| 2 | mol % | 3.65 | 0.00 | 0.00 | 0.00 | 0.00 | 0.00 | 100.00 |
| 3 | mol % | 3.68 | 0.00 | 0.00 | 0.00 | 0.00 | 0.00 | 100.00 |
| 4 | mol % | 3.71 | 0.00 | 0.00 | 0.00 | 0.00 | 0.00 | 100.00 |
| 5 | mol % | 3.73 | 0.00 | 0.00 | 0.00 | 0.00 | 0.00 | 100.00 |
| 6 | mol % | 3.76 | 0.00 | 0.00 | 0.00 | 0.00 | 0.00 | 100.00 |
| 7 | mol % | 3.73 | 0.00 | 0.00 | 0.00 | 0.00 | 0.00 | 100.00 |
| 8 | mol % | 3.65 | 0.00 | 0.00 | 0.00 | 0.00 | 0.00 | 100.00 |
| 9 | mol % | 3.76 | 0.00 | 0.00 | 0.00 | 0.00 | 0.00 | 100.00 |

TABLE 3-3-continued

| No. | | $Nb_2O_5$ | $Ta_2O_5$ | $WO_3$ | $GeO_2$ | $Bi_2O_3$ | $Al_2O_3$ | Total |
|---|---|---|---|---|---|---|---|---|
| 10 | mol % | 3.79 | 0.00 | 0.00 | 0.00 | 0.00 | 0.00 | 100.00 |
| 11 | mol % | 3.82 | 0.00 | 0.00 | 0.00 | 0.00 | 0.00 | 100.00 |
| 12 | mol % | 3.79 | 0.00 | 0.00 | 0.00 | 0.00 | 0.00 | 100.00 |
| 13 | mol % | 3.82 | 0.75 | 0.00 | 0.00 | 0.00 | 0.00 | 100.00 |
| 14 | mol % | 3.85 | 1.56 | 0.00 | 0.00 | 0.00 | 0.00 | 100.00 |
| 15 | mol % | 3.82 | 0.75 | 0.00 | 0.00 | 0.00 | 0.00 | 100.00 |
| 16 | mol % | 3.82 | 0.00 | 0.00 | 0.00 | 0.00 | 0.00 | 100.00 |
| 17 | mol % | 3.82 | 0.00 | 0.00 | 0.00 | 0.00 | 0.00 | 100.00 |
| 18 | mol % | 3.82 | 0.00 | 0.00 | 0.00 | 0.00 | 0.00 | 100.00 |
| 19 | mol % | 3.82 | 0.00 | 0.00 | 0.00 | 0.00 | 0.00 | 100.00 |
| 20 | mol % | 3.79 | 0.00 | 0.00 | 0.00 | 0.00 | 0.00 | 100.00 |
| 21 | mol % | 3.82 | 0.00 | 0.00 | 0.00 | 0.00 | 0.00 | 100.00 |
| 22 | mol % | 3.79 | 0.00 | 0.00 | 0.00 | 0.00 | 0.00 | 100.00 |
| 23 | mol % | 3.76 | 0.00 | 0.00 | 0.00 | 0.00 | 0.00 | 100.00 |
| 24 | mol % | 3.76 | 0.00 | 0.00 | 0.00 | 0.00 | 0.00 | 100.00 |
| 25 | mol % | 4.50 | 0.00 | 0.00 | 0.00 | 0.00 | 0.00 | 100.00 |
| 26 | mol % | 4.52 | 0.00 | 0.00 | 0.00 | 0.00 | 0.00 | 100.00 |
| 27 | mol % | 4.50 | 0.00 | 0.00 | 0.00 | 0.00 | 0.00 | 100.00 |
| 28 | mol % | 4.49 | 0.00 | 0.00 | 0.00 | 0.00 | 0.00 | 100.00 |
| 29 | mol % | 4.49 | 0.00 | 0.00 | 0.00 | 0.00 | 0.00 | 100.00 |
| 30 | mol % | 4.48 | 0.00 | 0.00 | 0.00 | 0.00 | 0.00 | 100.00 |
| 31 | mol % | 4.53 | 0.00 | 0.00 | 0.00 | 0.00 | 0.00 | 100.00 |
| 32 | mol % | 4.59 | 0.00 | 0.00 | 0.00 | 0.00 | 0.00 | 100.00 |
| 33 | mol % | 4.62 | 0.00 | 0.00 | 0.00 | 0.00 | 0.00 | 100.00 |
| 34 | mol % | 4.56 | 0.00 | 0.00 | 0.00 | 0.00 | 0.00 | 100.00 |
| 35 | mol % | 4.56 | 0.00 | 0.00 | 0.00 | 0.00 | 0.00 | 100.00 |
| 36 | mol % | 5.36 | 0.00 | 0.00 | 0.00 | 0.00 | 0.00 | 100.00 |

Example 2

Press-molding glass gobs formed of the optical glasses of Example 1 were produced in the following manner.

First, glass raw materials were prepared and formulated for obtaining the corresponding glass, charged into a platinum crucible, heated and melted, and the resultant molten glass was refined and stirred to give a homogeneous molten glass. Then, the molten glass was caused to flow out from a discharge pipe at a constant flow rate, and cast into a mold arranged horizontally below the discharge pipe, to shape a glass plate having a constant thickness. The shaped glass was continuously withdrawn in the horizontal direction through an opening portion provided on a side surface of the mold, carried into an annealing furnace by means of a belt conveyor and gradually cooled.

The gradually cooled glass was cut or split to prepare glass pieces, and these glass pieces were barrel-polished to form press-molding glass gobs.

In addition, there may be also employed a constitution in which a cylindrical mold is arranged below the discharge pipe, the molten glass is cast into this mold to shape it into a columnar glass, the columnar glass is withdrawn vertically downwardly through an opening portion of the mold bottom at a constant rate and then gradually cooled, the gradually cooled glass is cut or split to prepare glass pieces, and these glass pieces are barrel-polished to obtain press-molding glass gobs.

Example 3

A molten glass was caused to flow out of the discharge pipe in the same manner as in Example 2, the lower end of the glass flowing out was received with a shaping mold, and then the shaping mold is rapidly moved downward to cut off a molten glass flow on the basis of a surface tension, whereby a predetermined amount of a molten glass mass was obtained on the shaping mold. A gas was ejected from the shaping mold to apply a gas pressure to the glass upwardly, and while the glass was caused to float, it was shaped into a glass mass. The glass mass was taken out of the shaping mold and annealed. It was then barrel-polished to form a press-molding glass gob.

Example 4

A boron nitride powder as a mold release agent was uniformly applied to the entire surface of a press-molding glass gob obtained in Example 3. Then, the above glass gob was softened by heating it and press-molded to produce blanks of various lenses such as a concave meniscus lens, a convex meniscus lens, a biconvex lens, a biconcave lens, a plano-convex lens, a plano-concave lens, etc., and prisms.

Example 5

A molten glass was prepared in the same manner as in Example 2 and supplied onto that molding surface of a lower mold member to which a boron nitride powder as a mold release agent was uniformly applied, and when the molten glass amount on the lower mold member became a predetermined amount, the molten glass flow was cut off with cutting blades.

The thus-obtained molten glass mass on the lower mold member was press-molded with the upper and lower mold members to produce blanks of various lenses such as a concave meniscus lens, a convex meniscus lens, a biconvex lens, a biconcave lens, a plano-convex lens, a plano-concave lens, etc., and prisms.

Example 6

The blanks produced in Examples 4 and 5 were annealed. By the annealing, a strain within each glass was reduced, and optical properties such as a refractive index, etc., were adjusted to predetermined values.

Then, the blanks were cut and polished to obtain various lenses such as a concave meniscus lens, a convex meniscus lens, a biconvex lens, a biconcave lens, a plano-convex lens, a plano-concave lens, etc., and prisms. The surfaces of the thus-obtained optical elements may be coated with an anti-reflection film each.

Example 7

Glass plates and columnar glasses were produced in the same manner as in Example 2, and the thus-obtained glass shaped materials were annealed to reduce a strain inside and bring optical properties such as a refractive index into predetermined values.

Then, these glass shaped materials were cut, ground and polished to obtain of various lenses such as a concave meniscus lens, a convex meniscus lens, a biconvex lens, a biconcave lens, a plano-convex lens, a plano-concave lens, etc., and prisms. The surfaces of the thus-obtained optical elements may be coated with an anti-reflection film each.

INDUSTRIAL UTILITY

This invention provides an optical glass that can be stably provided, that has excellent glass stability and that has high-refractivity low-dispersion properties, and the optical glass is suitable for press-molding glass gobs, optical element blanks and optical elements.

The invention claimed is:

1. An optical glass that is an oxide glass and that comprises, by cationic %,
0 to 30% of $Si^{4+}$,
10 to 55% of $B^{3+}$,
less than 5% of total of $Li^+$, $Na^+$ and $K^+$,
less than 5% of total of $Mg^{2+}$, $Ca^{2+}$ and $Sr^{2+}$,
0 to 8% of $Ba^{2+}$,
0.1 to 15% of $Zn^{2+}$,
10 to 50% of $La^{3+}$,
0 to 20% of $Gd^{3+}$,
0.25 to 15% of $Y^{3+}$,
0 to 10% of $Yb^{3+}$,
0 to 20% of $Zr^{4+}$,
0.1 to 22% of $Ti^{4+}$,
0 to 20% of $Nb^{5+}$,
0 to 8% of $Ta^{5+}$,
0 to 5% of $W^{6+}$,
0 to 8% of $Ge^{4+}$,
0 to 10% of $Bi^{3+}$, and
0 to 10% of $Al^{3+}$,
the cationic ratio of the content of $Si^{4+}$ to the content of $B^{3+}$, $Si^{4+}/B^{3+}$, being less than 1.0, the total content of $Nb_2O_5$ and $Ta_2O_5$ as oxides being determined so as to achieve a liquidus temperature of 1,220° or lower, the optical glass having a refractive index nd of 1.930 to 2.2, an Abbe's number vd of 25 to 45 and a glass transition temperature Tg of 630° C. or higher.

2. The optical glass of claim 1, which has a coloring degree λ70 of less than 470 nm.

3. The optical glass of claim 1, which has a partial dispersion ratio Pg,F and an Abbe's number vd which satisfy the relationship of the following expression (1), $$Pg,F \leq -0.0017 \times vd + 0.660 \tag{1}$$

4. A press-molding glass gob formed of the optical glass recited in claim 1.

5. An optical element which is formed of the optical glass recited in claim 1.

6. A process for producing an optical element blank to be completed into an optical element by grinding and polishing, which comprises softening the press-molding glass gob recited in claim 4 by heating, and press-molding it.

7. A process for producing an optical element blank to be completed into an optical element by grinding and polishing, which comprises melting a glass raw material and press-molding the thus-obtained molten glass to produce an optical element blank formed of the optical glass recited in claim 1.

8. A process for producing an optical element, which comprises grinding and polishing the optical glass blank recited in claim 6.

9. A process for producing an optical element, which comprises grinding and polishing the optical glass blank recited in claim 7.

10. The optical glass of claim 1, comprising less than 2% of total of $Mg^{2+}$, $Ca^{2+}$ and $Sr^{2+}$.

11. The optical glass of claim 1, comprising 0 to 2% of $W^{6+}$.

12. The optical glass of claim 1, comprising 0 to 4% of $Ge^{4+}$.

13. The optical glass of claim 10, comprising 0 to 5% of $Ba^{2+}$.

14. The optical glass of claim 10, comprising 0 to 3% of $Ba^{2+}$.

15. The optical glass of claim 1, comprising less than 2% of total of $Mg^{2+}$, $Ca^{2+}$ and $Sr^{2+}$, 0 to 2% of $W^{6+}$, 0 to 4% $Ge^{4+}$ and 0 to 5% of $Ba^{2+}$.

* * * * *